United States Patent
Chen et al.

(10) Patent No.: US 11,616,681 B2
(45) Date of Patent: Mar. 28, 2023

(54) MULTI-USER DUPLICATE TRANSMISSION

(71) Applicant: QUALCOMM Incorporated, San Diego, CA (US)

(72) Inventors: Jialing Li Chen, San Diego, CA (US); Kanke Wu, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/330,238

(22) Filed: May 25, 2021

(65) Prior Publication Data

US 2022/0385521 A1 Dec. 1, 2022

(51) Int. Cl.
*H04L 27/28* (2006.01)
*H04L 27/20* (2006.01)
*H04L 1/00* (2006.01)

(52) U.S. Cl.
CPC ............ *H04L 27/28* (2013.01); *H04L 1/0003* (2013.01); *H04L 27/2007* (2013.01)

(58) Field of Classification Search
CPC .... H04L 27/28; H04L 1/0003; H04L 27/2007
See application file for complete search history.

(56) References Cited

U.S. PATENT DOCUMENTS

| | | | | |
|---|---|---|---|---|
| 2017/0041929 A1* | 2/2017 | Noh | ....................... | H04L 5/0053 |
| 2020/0136884 A1* | 4/2020 | Park | .................... | H04L 27/2663 |
| 2020/0382998 A1* | 12/2020 | Cao | ....................... | H04L 1/0041 |
| 2021/0212035 A1* | 7/2021 | Son | ........................ | H04H 20/95 |
| 2021/0218492 A1* | 7/2021 | Xin | .................... | H04L 27/2601 |
| 2021/0282146 A1* | 9/2021 | Kim | ................... | H04W 72/0493 |
| 2021/0288752 A1* | 9/2021 | Suh | ........................ | H04L 1/0009 |
| 2021/0337546 A1* | 10/2021 | Kim | .................. | H04W 72/0413 |
| 2021/0391961 A1* | 12/2021 | Cao | ............................ | H04L 1/08 |
| 2021/0409078 A1* | 12/2021 | Jeon | ..................... | H04B 7/0417 |
| 2021/0410131 A1* | 12/2021 | Lim | ....................... | H04L 1/0041 |
| 2022/0045889 A1* | 2/2022 | Yu | ........................ | H04W 24/02 |
| 2022/0060941 A1* | 2/2022 | Suh | ....................... | H04L 1/0041 |
| 2022/0078792 A1* | 3/2022 | Jeon | .................. | H04W 72/0453 |

(Continued)

OTHER PUBLICATIONS

"11be Preamble Structure"; Intel; Sep. 2019 (Year: 2019).*

(Continued)

*Primary Examiner* — Benjamin H Elliott, IV
(74) *Attorney, Agent, or Firm* — Holland & Hart LLP

(57) ABSTRACT

This disclosure provides methods, devices and systems for increasing the transmit power of wireless communication devices operating on power spectral density (PSD)-limited wireless channels. Some implementations more specifically relate to tone mapping techniques and packet designs that support duplicate (or "DUP mode") transmissions to multiple users. In some implementations, an access point (AP) may transmit a PPDU that includes first user data and second user data, where at least the first user data is transmitted in a DUP mode. As such, the first user data may be mapped to a number (N) of tones spanning a first RU in accordance with a dual carrier modulation (DCM) scheme, and a duplicate copy of the first user data may be mapped to N tones spanning a second RU in accordance with the DCM scheme. In some implementations, the second user data also may be transmitted in a DUP mode.

30 Claims, 20 Drawing Sheets

(56) References Cited

U.S. PATENT DOCUMENTS

2022/0158786 A1* 5/2022 Lim ................... H04L 1/0072
2022/0191560 A1* 6/2022 Bae ................... H04N 21/4402

OTHER PUBLICATIONS

"IEEE 802.11be Wi-Fi 7: New Challenges and Opportunities"; Deng et al.; IEEE Communications Surveys & Tutorials, vol. 22, No. 4, Fourth Quarter 2020 (Year: 2020).*
"IEEE P802.11 be™/D0.4, Draft Standard for Information Technology—Telecommunications and Information Exchange between Systems Local and Metropolitan Area Networks—Specific requirements, Part 11: Wireless LAN Medium Access Control (MAC) and Physical Layer (PHY) Specifications, Amendment 8: Enhancements for Extremely High Throughput (EHT)", Sections 36, 36.1 and 36.1.1, TGBE_CL_36, IEEE-SA, Piscataway, NJ, USA, vol. 802. 11be drafts, No. D0.4, Mar. 2021, 511 Pages, Apr. 5, 2021, pp. 1-511, XP068183575.
International Search Report and Written Opinion—PCT/US2022/029983—ISA/EPO—dated Aug. 1, 2022 (2104524WO).
Sundaravaradhan S.P., et al.,(BROADCOM): "PDT PHY-EHT DUP Mode", IEEE Draft, 11-21-0139-03-00BE-PDT-PHY-EHT-DUP-Mode, IEEE-SA Mentor, Piscataway, NJ USA, vol. 802.11 EHT, 802.11be, No. 3, Feb. 8, 2021, pp. 1-9, XP068176191, Sections 36.3.X, 36.3.6.10.

* cited by examiner

| | | | | |
|---|---|---|---|---|
| 16TH 20 MHZ | L-STF | L-LTF | L-SIG | RL-SIG | U-SIG |
| 15TH 20 MHZ | L-STF | L-LTF | L-SIG | RL-SIG | U-SIG |
| 14TH 20 MHZ | L-STF | L-LTF | L-SIG | RL-SIG | U-SIG |
| 13TH 20 MHZ | L-STF | L-LTF | L-SIG | RL-SIG | U-SIG |
| 12TH 20 MHZ | L-STF | L-LTF | L-SIG | RL-SIG | U-SIG |
| 11TH 20 MHZ | L-STF | L-LTF | L-SIG | RL-SIG | U-SIG |
| 10TH 20 MHZ | L-STF | L-LTF | L-SIG | RL-SIG | U-SIG |
| 9TH 20 MHZ | L-STF | L-LTF | L-SIG | RL-SIG | U-SIG |
| 8TH 20 MHZ | L-STF | L-LTF | L-SIG | RL-SIG | U-SIG |
| 7TH 20 MHZ | L-STF | L-LTF | L-SIG | RL-SIG | U-SIG |
| 6TH 20 MHZ | L-STF | L-LTF | L-SIG | RL-SIG | U-SIG |
| 5TH 20 MHZ | L-STF | L-LTF | L-SIG | RL-SIG | U-SIG |
| 4TH 20 MHZ | L-STF | L-LTF | L-SIG | RL-SIG | U-SIG |
| 3RD 20 MHZ | L-STF | L-LTF | L-SIG | RL-SIG | U-SIG |
| 2ND 20 MHZ | L-STF | L-LTF | L-SIG | RL-SIG | U-SIG |
| 1ST 20 MHZ | L-STF | L-LTF | L-SIG | RL-SIG | U-SIG |

EHT-SIG

*Figure 7*

MULTI-USER DUPLICATE TRANSMISSION

TECHNICAL FIELD

This disclosure relates generally to wireless communication, and more specifically to multi-user duplicate transmission techniques.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Some wireless communication devices may be capable of duplicate (or "DUP mode") transmissions. For example, an initial release of the IEEE 802.11be amendment of the IEEE 802.11 standard supports an Extremely High Throughput (EHT) DUP mode for single user transmissions. In the EHT DUP mode, user data is mapped to a first resource unit (RU) in accordance with a dual carrier modulation (DCM) scheme so that the first RU carries two copies of the user data, and a duplicate copy of the user data is mapped to a second RU in accordance with the DCM scheme so that the second RU also carries two copies of the user data. As a result, four copies of the user data are spread across the first and second RUs.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include generating a physical layer (PHY) convergence protocol (PLCP) protocol data unit (PPDU) that includes first user data intended for a first user and second user data intended for a second user, where the PPDU carries bandwidth split information indicating a first bandwidth allocated for the first user data and a second bandwidth allocated for the second user data and further carries duplicate transmission information indicating that the first bandwidth is associated with a duplicate transmission; mapping the first user data to a number (N) of tones spanning a first portion of the first bandwidth in accordance with a dual carrier modulation (DCM) scheme; mapping a duplicate copy of the first user data to N tones spanning a second portion of the first bandwidth in accordance with the DCM scheme; and transmitting the PPDU over a wireless channel spanning the first bandwidth and the second bandwidth.

In some implementations, the PPDU may be a multi-user (MU) PPDU having a PHY preamble that includes a universal signal field (U-SIG) followed by a non-legacy signal field, where the bandwidth split information and the duplicate transmission information are carried in the non-legacy signal field of the PHY preamble. In some aspects, the bandwidth split information may be indicated by a value of a resource unit (RU) allocation subfield of a common field of the non-legacy signal field, where the common field carries information common to each user associated with the PPDU. In some aspects, the indication that the first bandwidth is associated with a duplicate transmission may be carried in a modulation and coding scheme (MCS) subfield of a first user field of the non-legacy signal field that carries information specific to the first second user. In some aspects, the MCS subfield of the first user field may be set to an MCS index equal to 14. In some aspects, U-SIG may include an MCS subfield carrying information indicating an MCS associated with the non-legacy signal field, where the MCS subfield is set to a value representing rate ½ coding, binary phase-shift keying (BPSK) modulation, and DCM.

In some other implementations, the PPDU may be an MU PPDU having a PHY preamble that includes a U-SIG followed by a non-legacy signal field, where the duplicate transmission information is carried in U-SIG and the bandwidth split information is carried in the non-legacy signal field of the PHY preamble. In some aspects, the duplicate transmission information may be indicated based on a value of a duplicate transmission indication bit in U-SIG. In some other aspects, the duplicate transmission information may be indicated by a value of a PPDU type and compression mode field of U-SIG. Still further, in some aspects, the duplicate transmission information may be further indicated based on a value of a Validate field of U-SIG. In some aspects, the bandwidth split information may be indicated by a value of a bandwidth split field of the non-legacy signal field. In some aspects, U-SIG may include an MCS subfield carrying information indicating an MCS associated with the non-legacy signal field, where the MCS subfield is set to a value representing rate ½ coding and BPSK modulation.

In some implementations, the method may further include mapping the second user data to a number (M) of tones spanning a first portion of the second bandwidth in accordance with the DCM scheme; and mapping a duplicate copy of the second user data to M tones spanning a second portion of the second bandwidth in accordance with the DCM scheme, where the duplicate transmission information further indicates that the second bandwidth is associated with a duplicate transmission. In some aspects, the PPDU may be an MU PPDU having a PHY preamble that includes a U-SIG followed by a non-legacy signal field, where the indication that the second bandwidth is associated with a duplicate transmission is carried in an MCS subfield of a user field of the non-legacy signal field carrying information specific to the second user.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including generating a PPDU that includes first user data intended for a first user and second user data intended for a second user, where the PPDU carries bandwidth split information indicating a first bandwidth allocated for the first user data and a second bandwidth allocated for the second user data and further carries duplicate transmission information indicating that the first bandwidth is associated with a duplicate transmission; mapping the first user data to a number (N) of tones spanning a first portion of the first bandwidth in accordance with a DCM scheme; mapping a duplicate copy of the first user data to N tones spanning a second portion of the first bandwidth in accordance with the DCM scheme; and transmitting the PPDU over a wireless channel spanning the first bandwidth and the second bandwidth.

Another innovative aspect of the subject matter described in this disclosure can be implemented as a method of wireless communication. The method may be performed by a wireless communication device, and may include generating a first PPDU that includes first user data intended for a first user, where the first PPDU carries bandwidth information indicating a first bandwidth allocated for the first user data and further carries first duplicate transmission information indicating that the first bandwidth is associated with a duplicate transmission; mapping the first user data to a number (N) of tones spanning a first portion of the first bandwidth in accordance with a DCM scheme; mapping a duplicate copy of the first user data to N tones spanning a second portion of the first bandwidth in accordance with the DCM scheme; and transmitting an aggregated PPDU (A-PPDU), including the first PPDU and a second PPDU, over a wireless channel spanning the first bandwidth and a second bandwidth associated with the second PPDU.

In some implementations, the first PPDU may be formatted in accordance with a non-legacy MU PPDU format for transmission to a single user. In such implementations, the indication that the first bandwidth is associated with a duplicate transmission may be carried in an MCS subfield of a PHY preamble of the first PPDU.

In some implementations, the method may further include mapping the second user data to a number (M) of tones spanning a first portion of the second bandwidth in accordance with the DCM scheme; and mapping a duplicate copy of the second user data to M tones spanning a second portion of the second bandwidth in accordance with the DCM scheme, where the second PPDU carries second duplicate transmission information indicating that the second bandwidth is associated with a duplicate transmission.

In some implementations, the second PPDU may be formatted in accordance with a non-legacy MU PPDU format for transmission to a single user. In such implementations, the indication that the second bandwidth is associated with a duplicate transmission may be carried in an MCS subfield of a PHY preamble of the second PPDU.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including generating a first PPDU that includes first user data intended for a first user, where the first PPDU carries bandwidth information indicating a first bandwidth allocated for the first user data and further carries first duplicate transmission information indicating that the first bandwidth is associated with a duplicate transmission; mapping the first user data to a number (N) of tones spanning a first portion of the first bandwidth in accordance with a DCM scheme; mapping a duplicate copy of the first user data to N tones spanning a second portion of the first bandwidth in accordance with the DCM scheme; and transmitting an A-PPDU, including the first PPDU and a second PPDU, over a wireless channel spanning the first bandwidth and a second bandwidth associated with the second PPDU.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 7 shows an example frame structure of a non-legacy PPDU allocated over multiple subchannels of a wireless channel according to some implementations.

Like reference numbers and designations in the various drawings indicate like elements.

DETAILED DESCRIPTION

Figure 1:
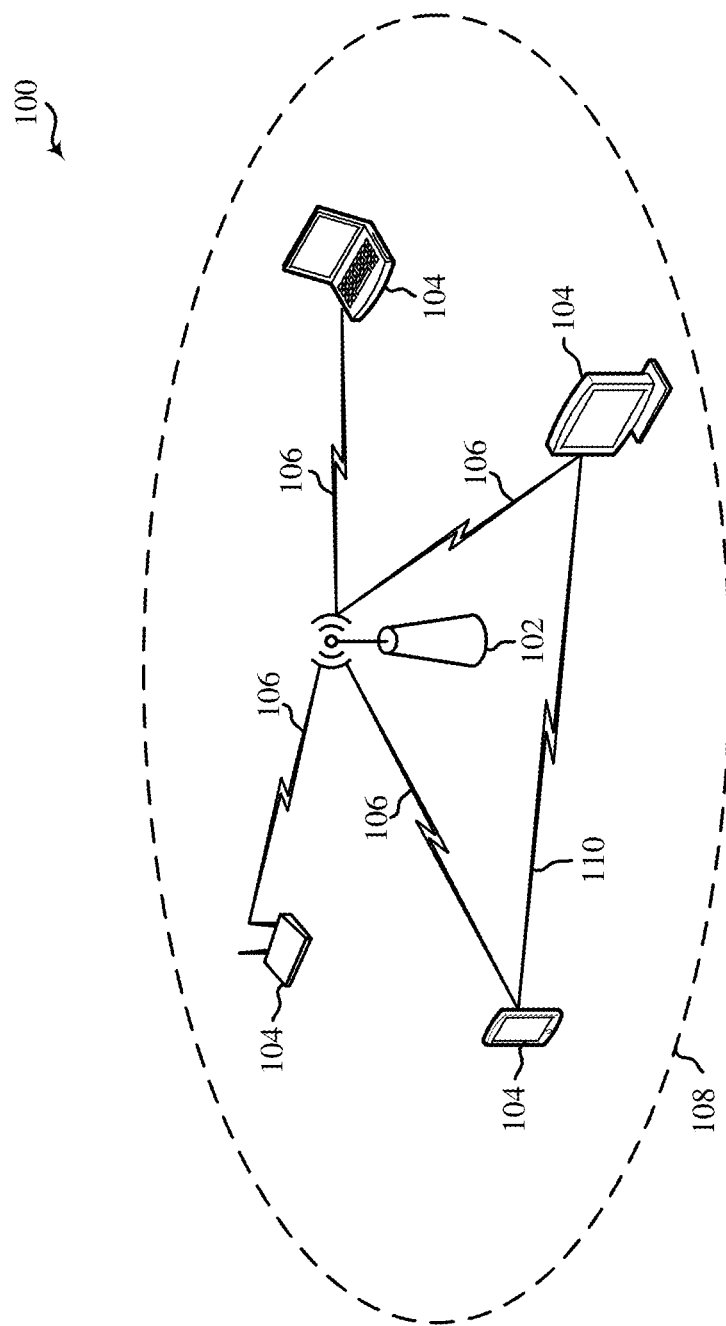
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to duplicate transmissions, and more particularly, to tone mapping techniques and physical layer convergence protocol (PLCP) protocol data unit (PPDU) designs that support duplicate OFDMA transmissions to multiple users. In some implementations, an access point (AP) may transmit a PPDU that includes first user data intended for a first user and second user data intended for a second user, where at least the first user data is transmitted in a DUP mode. As such, the first user data may be mapped to a number (N) of tones spanning a first resource unit (RU) in accordance with a dual carrier modulation (DCM) scheme, and a duplicate copy of the first user data may be mapped to N tones spanning a second RU in accordance with the DCM scheme. As a result, each of the first and second RUs carries two copies of the first user data. In some implementations, the second user data also may be transmitted in a DUP mode. As such, the second user data may be mapped to a number (M) of tones spanning a third RU in accordance with the DCM scheme, and a duplicate copy of the second user data may be mapped to M tones spanning a fourth RU in accordance with the DCM scheme. As a result, each of the third and fourth RUs carries two copies of the second user data. In some aspects, the PPDU may be a multi-user (MU) PPDU. In some other aspects, the PPDU may be an aggregated PPDU (A-PPDU), where each user is associated with a respective sub-PPDU with transmission to a single user in the DUP mode.

Particular implementations of the subject matter described in this disclosure can be implemented to realize one or more of the following potential advantages. Duplicate transmissions provide greater flexibility in medium utilization, particularly in power spectral density (PSD)-limited wireless channels. By duplicating user data across multiple RUs transmitted in a PPDU, aspects of the present disclosure may increase the overall transmit power of the PPDU without exceeding the PSD limits of the wireless channel. More specifically, the combination of DCM and RU duplication allows 4 copies of the same user data to be transmitted concurrently, resulting in a 4× increase in transmit power. For example, the duplicate transmissions may be combined at the receiving device to achieve a 4× gain in signal-to-interference-plus-noise ratio (SINR) for the data portion of the PPDU. Such increases in SINR can help overcome greater pathloss and thus increase the effective range of wireless communications on PSD-limited wireless channels. By multiplexing duplicate transmissions for multiple users in a single PPDU (such as an MU-PPDU or an A-PPDU), aspects of the present disclosure may achieve increased gains in SINR at multiple receiving devices while improving spectral efficiency.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
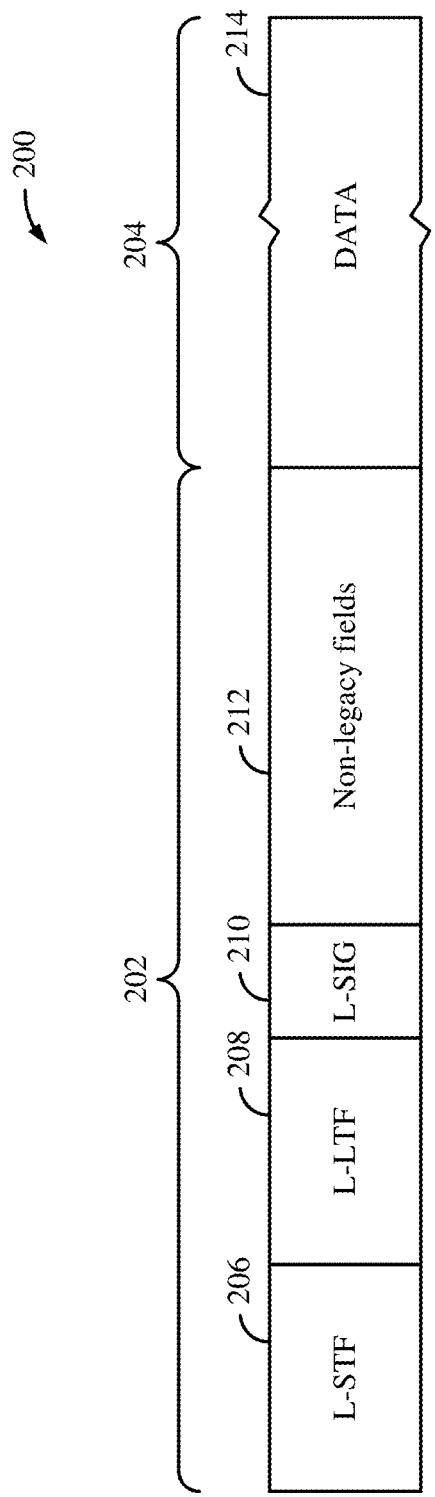
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
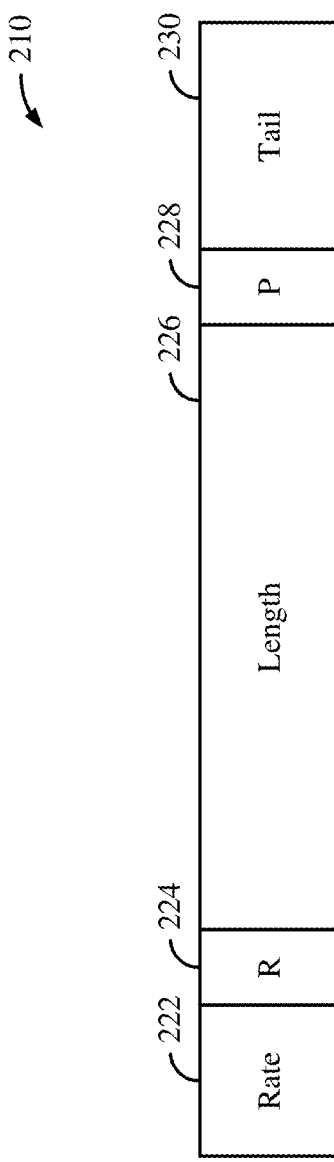
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3:
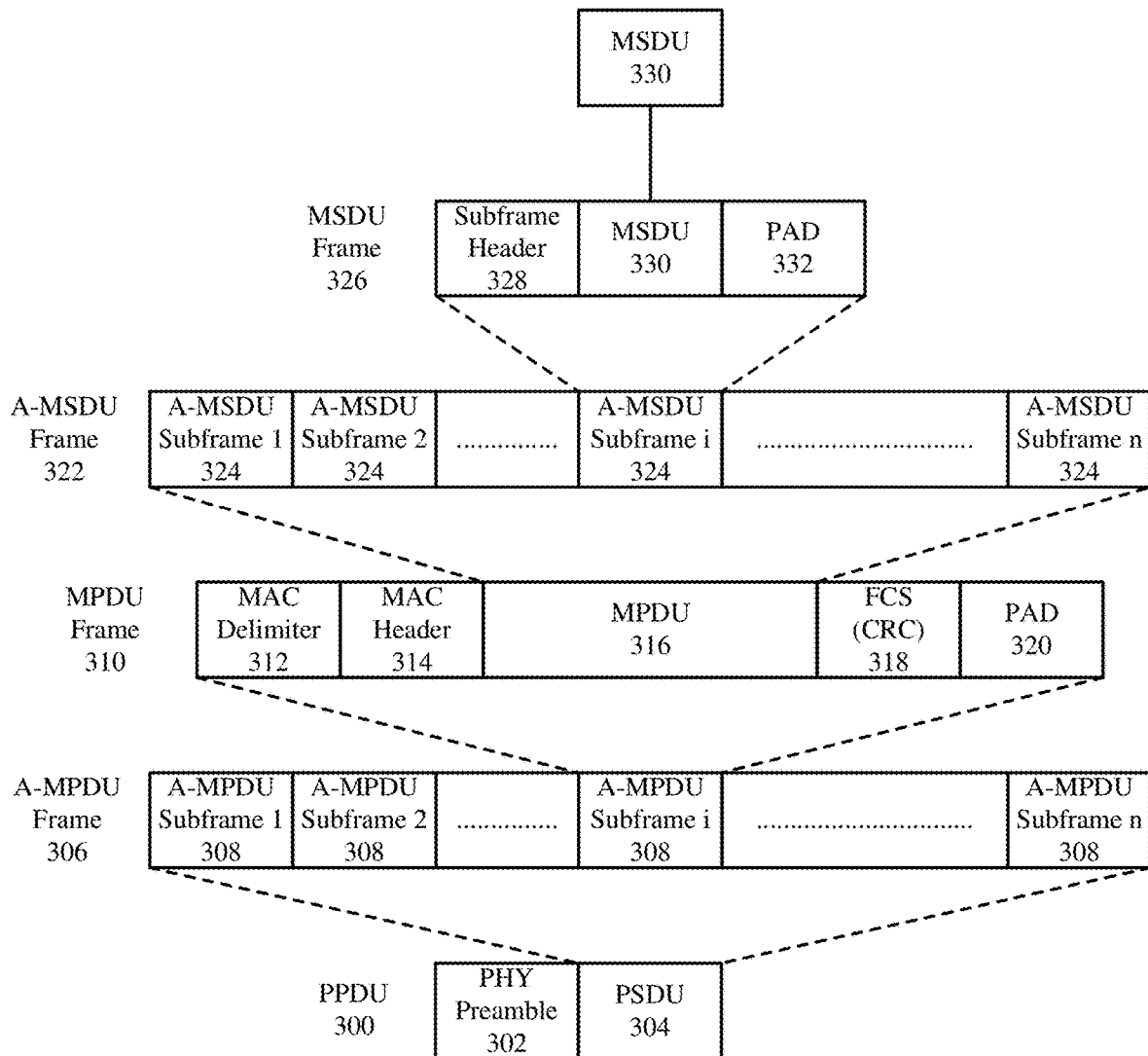
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
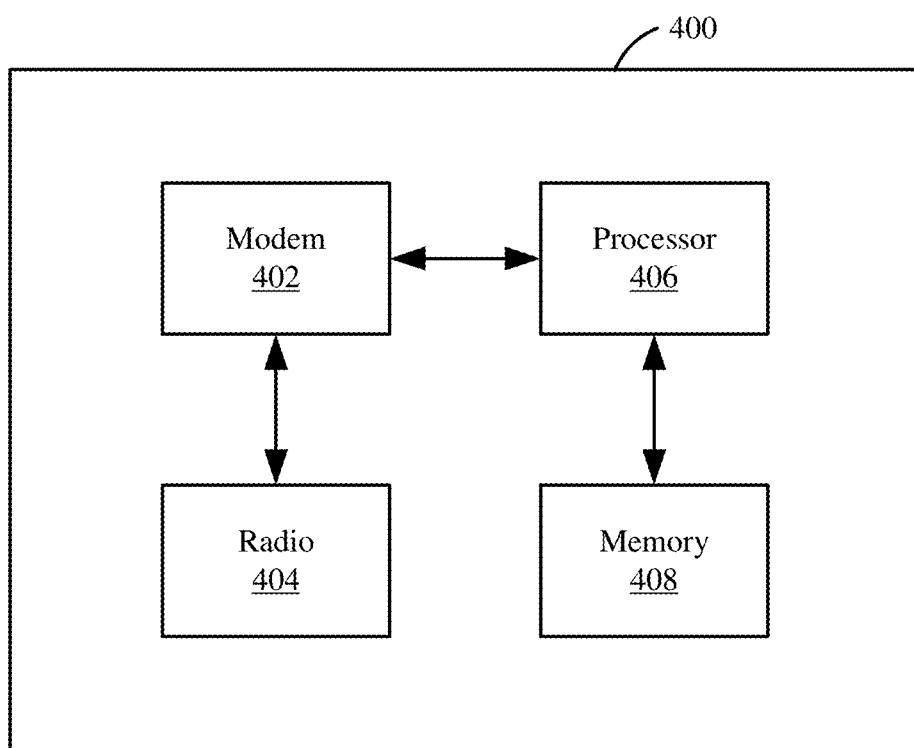
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
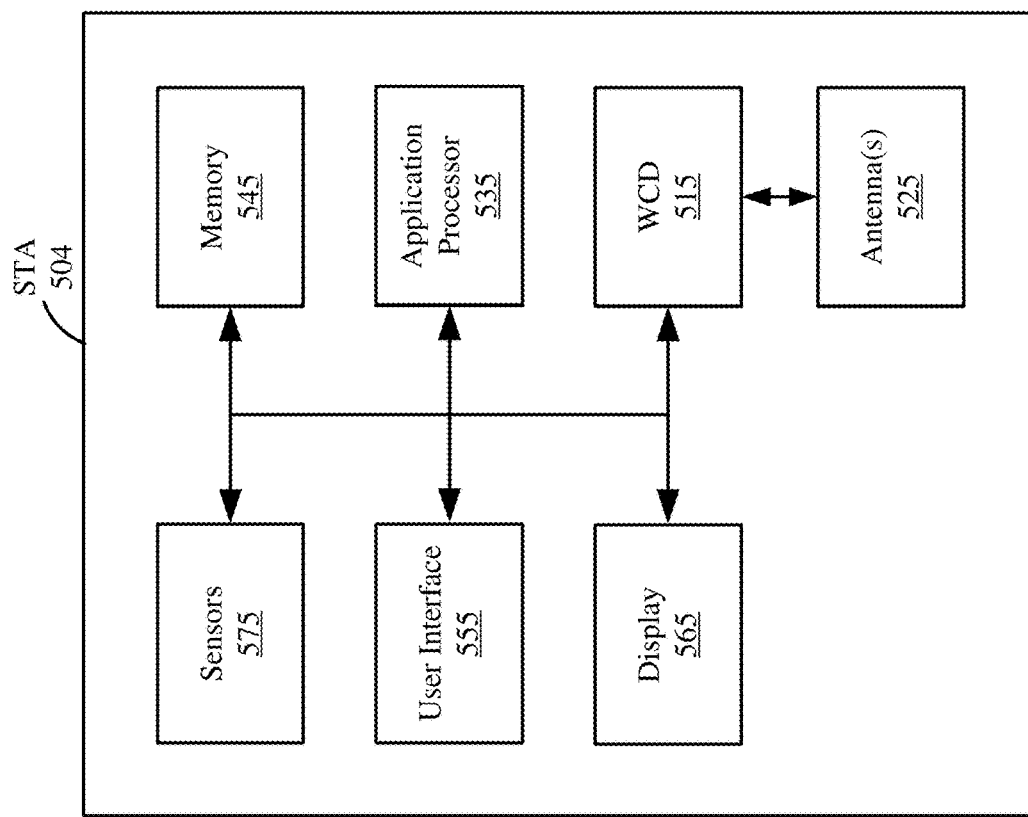
FIG. 5B shows a block diagram of an example STA.
Figure 5A:
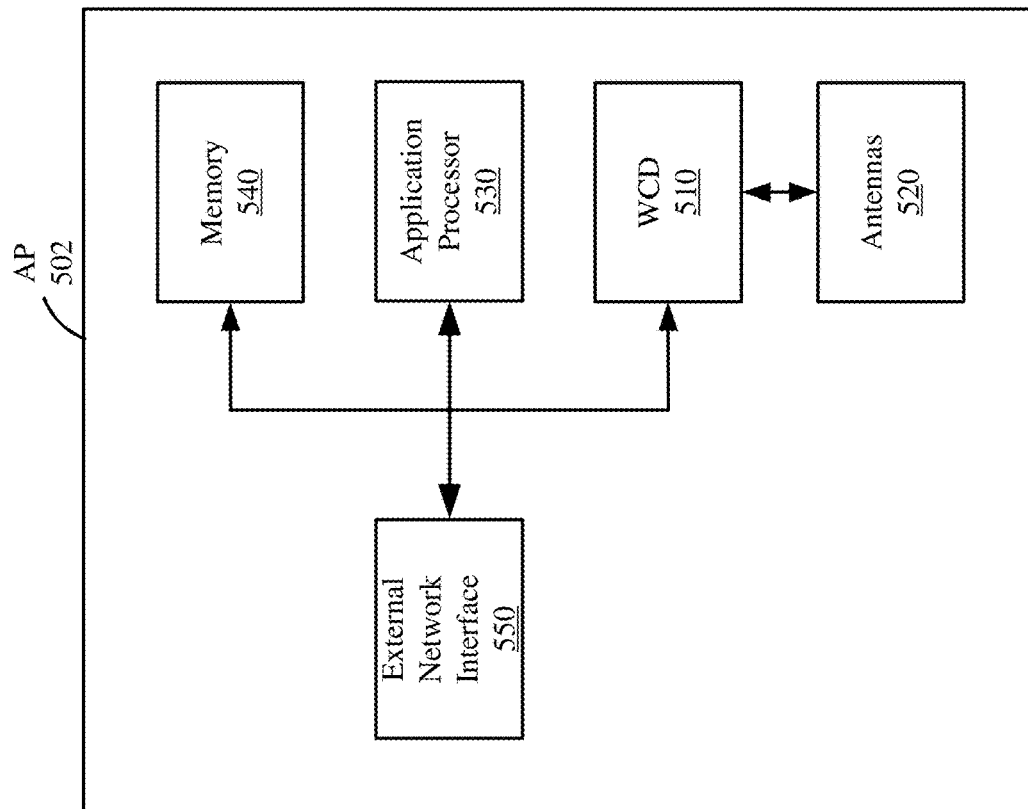
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

Figure 6:
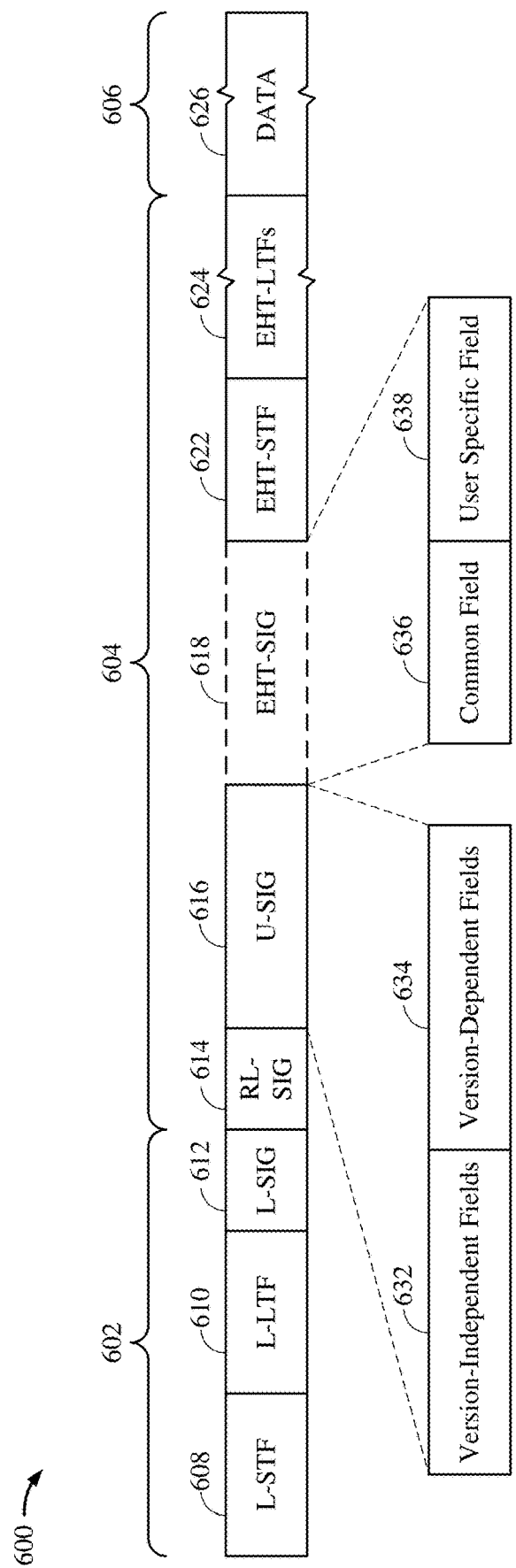
FIG. 6 shows an example PPDU usable for communications between an AP and a number of STAs according to some implementations.

FIG. 6 shows an example PPDU 600 usable for wireless communication between an AP and a number of STAs according to some implementations. The PPDU 600 includes a PHY preamble including a first portion 602 and a second portion 604. The PPDU 600 may further include a PHY payload 606 after the preamble, for example, in the form of a PSDU carrying a data field 626. In some implementations, the PPDU 600 may be formatted as a non-legacy or Extremely High Throughput (EHT) PPDU.

The first portion 602 of the PHY preamble includes L-STF 608, L-LTF 610, and L-SIG 612. The second portion 604 of the PHY preamble includes a repeated legacy signal field (RL-SIG) 614, a universal signal field (U-SIG) 616, a non-legacy short training field (EHT-STF) 622, and a number of non-legacy long training fields (EHT-LTFs) 624. In some implementations, the second portion 604 may further include a non-legacy signal field (EHT-SIG) 618. In the IEEE 802.11be amendment, and future generations of the IEEE 802.11 standard, new fields may be used to carry signaling information. For example, at least some of the new fields and signaling information may be included in U-SIG 616. Additionally, new fields and signaling information may be included in EHT-SIG 618 (or may overflow from U-SIG 616 into EHT-SIG 618).

In some implementations, U-SIG 616 may include signaling regarding types or formats of additional signal fields that may follow U-SIG 616. Such signaling may be carried in one or more version-independent fields 632 and one or more version-dependent fields 634. The version-independent fields 632 may include, for example, a version identifier subfield carrying information indicating a version of the associated wireless communication protocol (starting from the IEEE 802.11be amendment and beyond) and a PPDU bandwidth subfield carrying information indicating a bandwidth associated with the PPDU 600 (such as from 20 MHz to 320 MHz). The version-dependent fields 634 may carry information used for interpreting other fields of U-SIG 616 or EHT-SIG 618. Example version-dependent fields 634 include a PPDU format and EHT-SIG compression subfield carrying information indicating a format of the PPDU 600 and one or more spatial reuse subfields carrying information indicating whether spatial reuse is permitted on one or more subchannels of the wireless channel over which the PPDU 600 is transmitted.

EHT-SIG 618 may include a common field 636 and a user specific field 638. The common field 636 may include U-SIG overflow representing one or more bits or fields overflowed from U-SIG 616 or an RU allocation subfield carrying information indicating an allocation of RUs for intended recipients of the PPDU 600. The user specific field 638 may include a number of user fields carrying per-user information for intended recipients of the PPDU 600. The contents and availability of EHT-SIG 618 may depend on the format of the PPDU 600. For example, EHT-SIG 618 may be present in the EHT MU PPDU format, but absent in the EHT trigger-based (TB) PPDU format.

FIG. 7 shows an example frame structure of a non-legacy PPDU 700 allocated over multiple subchannels of a wireless channel according to some implementations. In some implementations, the PPDU 700 may be one example of the PPDU 600 of FIG. 6. More specifically, the PPDU 700 may be an EHT MU PPDU. In the example of FIG. 7, the EHT PPDU 700 is shown to include an L-STF, an L-LTF, an L-SIG, an RL-SIG, a U-SIG, and an EHT-SIG signaled or transmitted on multiple 20 MHz subchannels (or frequency segments) of a 320 MHz wireless channel. In some other implementations, the wireless channel may encompass any range of frequencies including, but not limited to, a 160 MHz frequency spectrum, a 240 MHz frequency spectrum, a 480 MHz frequency spectrum, or a 640 MHz frequency spectrum. As shown in FIG. 7, the 320 MHz frequency spectrum includes sixteen 20 MHz subchannels indexed from lowest to highest (such as from the $1^{st}$ to the $16^{th}$).

In the example of FIG. 7, L-STF, L-LTF, L-SIG, and RL-SIG are duplicated or repeated in each 20 MHz subchannel spanning the entirety of the 320 MHz frequency spectrum. In some implementations, U-SIG may be duplicated or repeated in each 20 MHz subchannel of a respective 80 MHz segment of the wireless channel. For example, the first four subchannels ($1^{st}$ through $4^{th}$) may share the same U-SIG fields and values. The next four subchannels ($5^{th}$ through $8^{th}$) may share the same U-SIG fields and values, which may be different than the U-SIG fields or values of the previous four subchannels. The next four subchannels ($9^{th}$ through $12^{th}$) may share the same U-SIG fields and values, which in turn may be different than the U-SIG fields or values in any of the previous eight subchannels. The next four subchannels ($13^{th}$ through $16^{th}$) may share the same U-SIG fields and values, which in turn may be different than the U-SIG fields or values in any of the previous twelve subchannels. In other words, the U-SIG fields or values may change every 80 MHz. This may allow for greater parallelization of U-SIG information across the various subchannels.

In some implementations, EHT-SIG may be signaled on a number of content channels. Each content channel may be defined by a particular grouping of subchannels. For example, a first content channel may carry the signaling information for all odd-numbered subchannels (such as the $1^{st}$, $3^{rd}$, $5^{th}$, $7^{th}$, $9^{th}$, $11^{th}$, $13^{th}$, and $15^{th}$ 20 MHz subchannels) and a second content channel may carry the signaling information for all even-numbered subchannels (such as the $2^{nd}$, $4^{th}$, $6^{th}$, $8^{th}$, $10^{th}$, $12^{th}$, $14^{th}$, and $16^{th}$ 20 MHz subchannels). In some implementations, EHT-SIG may be duplicated or repeated per content channel. For example, the (odd-numbered) subchannels associated with the first content channel may share the same EHT-SIG fields and values. The (even-numbered) subchannels associated with the second content channel may share the same EHT-SIG fields and values, which may be different than the EHT-SIG fields or values of the first content channel.

As described above, some wireless communication devices may be capable of duplicate (or "DUP mode") transmissions. For example, an initial release of the IEEE 802.11be amendment of the IEEE 802.11 standard supports an Extremely High Throughput (EHT) DUP mode for single user transmissions. In the EHT DUP mode, user data is mapped to a first RU in accordance with a DCM scheme so that the first RU carries two copies of the user data, and a duplicate copy of the user data is mapped to a second RU in accordance with the DCM scheme so that the second RU also carries two copies of the user data. As a result, four copies of the user data are spread across the first and second RUs.

Various aspects relate generally to duplicate transmissions, and more particularly, to tone mapping techniques and PPDU designs that support duplicate OFDMA transmissions to multiple users. In some implementations, an AP may transmit a PPDU that includes first user data intended for a first user and second user data intended for a second user, where at least the first user data is transmitted in a DUP mode. As such, the first user data may be mapped to a number (N) of tones spanning a first RU in accordance with a DCM scheme, and a duplicate copy of the first user data may be mapped to N tones spanning a second RU in accordance with the DCM scheme. As a result, each of the first and second RUs carries two copies of the first user data. In some implementations, the second user data also may be transmitted in a DUP mode. As such, the second user data may be mapped to a number (M) of tones spanning a third RU in accordance with the DCM scheme, and a duplicate copy of the second user data may be mapped to M tones spanning a fourth RU in accordance with the DCM scheme. As a result, each of the third and fourth RUs carries two copies of the second user data. In some aspects, the PPDU may be an MU PPDU. In some other aspects, the PPDU may be an A-PPDU, where each user is associated with a respective sub-PPDU with transmission to a single user in the DUP mode.

Particular implementations of the subject matter described in this disclosure can be implemented to realize one or more of the following potential advantages. Duplicate transmissions provide greater flexibility in medium utilization, particularly in PSD-limited wireless channels. By duplicating user data across multiple RUs transmitted in a PPDU, aspects of the present disclosure may increase the overall transmit power of the PPDU without exceeding the PSD limits of the wireless channel. More specifically, the combination of DCM and RU duplication allows 4 copies of the same user data to be transmitted concurrently, resulting in a 4× increase in transmit power. For example, the duplicate transmissions may be combined at the receiving device to achieve a 4× gain in SINR for the data portion of the PPDU. Such increases in SINR can help overcome greater pathloss and thus increase the effective range of wireless communications on PSD-limited wireless channels. By multiplexing duplicate transmissions for multiple users in a single PPDU (such as an MU-PPDU or an A-PPDU), aspects of the present disclosure may achieve increased gains in SINR at multiple receiving devices while improving spectral efficiency.

Figure 8:
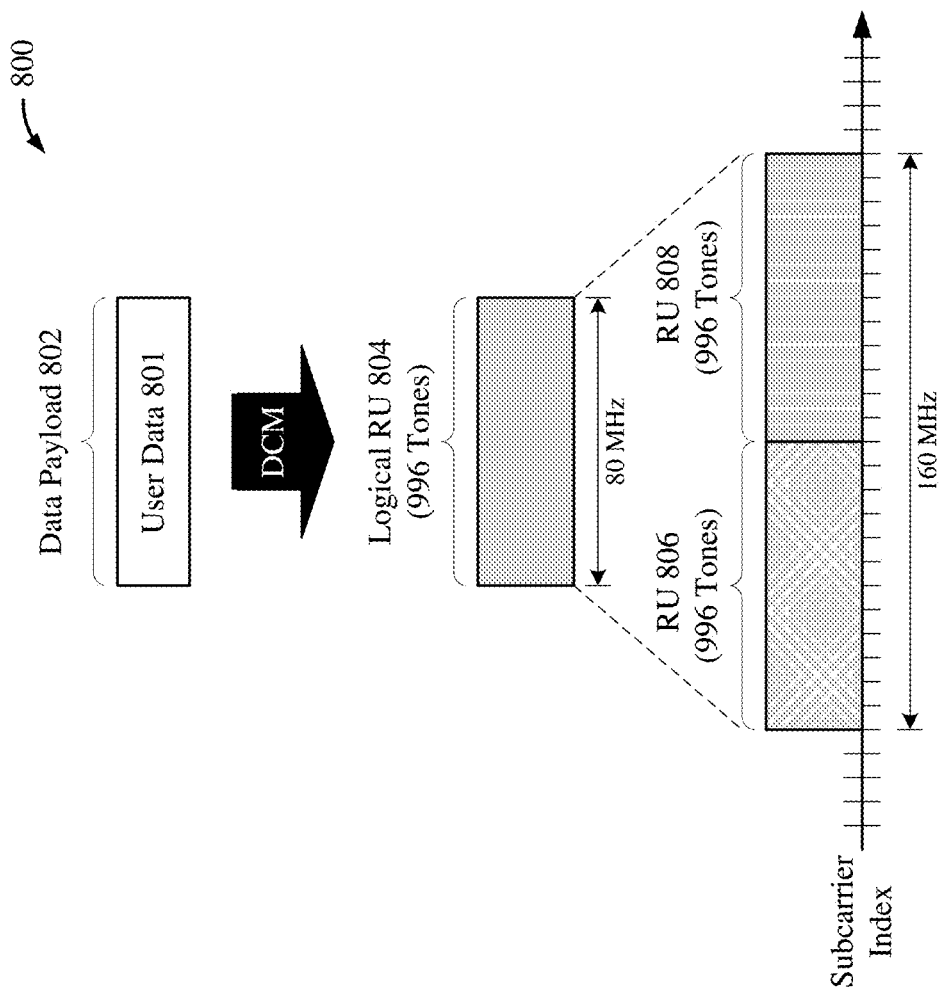
FIG. 8 shows a frequency diagram depicting an example duplicate tone mapping according to some implementations.

FIG. 8 shows a frequency diagram 800 depicting an example duplicate tone mapping according to some implementations. More specifically, FIG. 8 shows an example mapping of a data payload 802 to a set of tones or subcarriers for transmission over a wireless channel. In some implementations, the data payload 802 may be one example of the data field 626 of the PPDU 600 depicted in FIG. 6. In the example of FIG. 8, the data payload 802 includes user data 801 intended for a single user.

The user data 801 is mapped to a logical RU 804 in accordance with a DCM scheme. The logical RU 804 represents a number of tones that are allocated for the transmission of the user data 801. In the example of FIG. 8, the logical RU 804 includes 996 tones (spanning an 80 MHz bandwidth). However, in actual implementations, the logical RU 804 may include any suitable number of tones. DCM is a modulation technique that encodes the same user data 801 on two tones or subcarriers of the logical RU 804. More specifically, tones that carry the same user data 801 are separated by a fixed bandwidth to achieve frequency diversity and reduce channel fading. For example, a BPSK-DCM mapper can be used to map the user data 801 to a lower portion of the logical RU 804, and to map the same user data 801 to an upper portion of the logical RU 804, in accordance with a BPSK modulation scheme. As a result, the logical RU 804 includes two copies of the user data 801.

The logical RU 804 is further mapped to a pair of physical RUs 806 and 808. The physical RUs 806 and 808 represent the physical resources (identified by subcarrier indices) that are modulated to transmit the user data. In a duplicate transmission, the logical RU 804 is duplicated across the pair of physical RUs 806 and 808. For example, the logical RU 804 may be mapped to a number (N) of subcarrier indices spanning the first RU 806 and also mapped to N subcarrier indices spanning the second RU 808. As a result, the first RU 806 carries the same information as the second RU 808. Because the information in the logical RU 804 is mapped to each of the physical RUs 806 and 808, the user data 801 is effectively transmitted 4 times (in the frequency domain) on 2N subcarrier indices spanning the bandwidth of the RUs 806 and 808. Each of the physical RUs 806 and 808 is equal in size to the logical RU 804 (N=996). Thus, in the example of FIG. 8, the physical RUs 806 and 808 are transmitted on a 160 MHz-wide channel.

A transmitting device (such as an AP) may include a duplicate transmission mapper that maps the logical RU 804 to the physical RUs 806 and 808 in the frequency domain (such as described with reference to FIG. 8). The physical RUs 806 and 808 are further converted to a time-domain signal (such as by an inverse fast Fourier transform (IFFT)) for transmission over a wireless channel. A receiving device (such as a STA) receives the time-domain signal over the wireless channel and converts the time-domain signal back to the physical RUs 806 and 808 in the frequency domain (such as by a fast Fourier transform (FFT)). The receiving device may further include a duplicate transmission demapper that demaps the physical RUs 806 and 808 to the logical RU 804. In other words, the duplicate transmission demapper reverses the mapping performed by the duplicate transmission mapper at the transmitting device. The receiving device can then recover the user data 801 carried (or modulated) on the logical RU 804 as a result of the demapping.

To reduce the peak-to-average power ratio (PAPR) of the duplicate transmission, the transmitting device may apply a respective phase rotation (in the frequency domain) to each copy of the user data 801. For example, the transmitting device may apply a 4-part phase rotation [a(1), a(2), a(3), a(4)] to the frequency-domain signal [x, $x_{DCM}$, x, $x_{DCM}$], where x is the frequency-domain signal representing the original user data 801 (prior to DCM-encoding) which is associated with $N_{SD}$ tones or subcarriers and [x, $x_{DCM}$] is the DCM-encoded frequency-domain signal carried (or modulated) on the logical RU 804 (which then becomes data for $2N_{SD}$ tones and subcarriers) and mapped to each of the RUs 806 and 808 (where $x_{DCM}(k)=(-1)^{k+N_{SD}}*x(k)$, x(k) and $x_{DCM}(k)$ are the k-th elements (on the k-th logical tone) of x and $x_{DCM}$, respectively, and k=[0,1, ..., $N_{SD}$−1]). Thus, the resulting phase-rotated signal (y) can be expressed according to Equation 1:

$$y=[a(1)x, a(2)x_{DCM}, a(3)x, a(4)x_{DCM}] \qquad (1)$$

By setting a(1)=1, the remaining phase rotations a(2), a(3), and a(4) can be set to any combination of 1 or −1 to reduce the PAPR of the signal y. In some aspects, the 4-part phase rotation can equal to [1, 1, −1, 1].

By transmitting 4 copies of the user data 801, concurrently, in the data payload 802 of a single PPDU, the transmitting device can effectively boost its overall transmit power by 4×. For example, some wireless channels (such as in the 6 GHz frequency band) impose PSD limits on the transmit power of an AP or STA for a given frequency bandwidth (such as per MHz). However, by spreading the copies of the user data 801 across a wider bandwidth (such as from 40 MHz to 80 MHz), the duplicate transmission techniques can increase the overall transmit power of the user data 801 without exceeding the PSD limits of the wireless channel. For example, the duplicate transmissions can be combined at the receiving device to achieve a 4× gain in SINR for the data payload 802. In the example of FIG. 8, the data payload 802 is shown to include user data 801 for a single user. For example, the data payload 802 may be transmitted in a PPDU for transmission to a single user. In some implementations, duplicate transmissions may be extended to multiple OFDMA users associated with a PPDU. In other words, each user's data may be transmitted in a DUP mode in the data portion of the PPDU.

Figure 9:
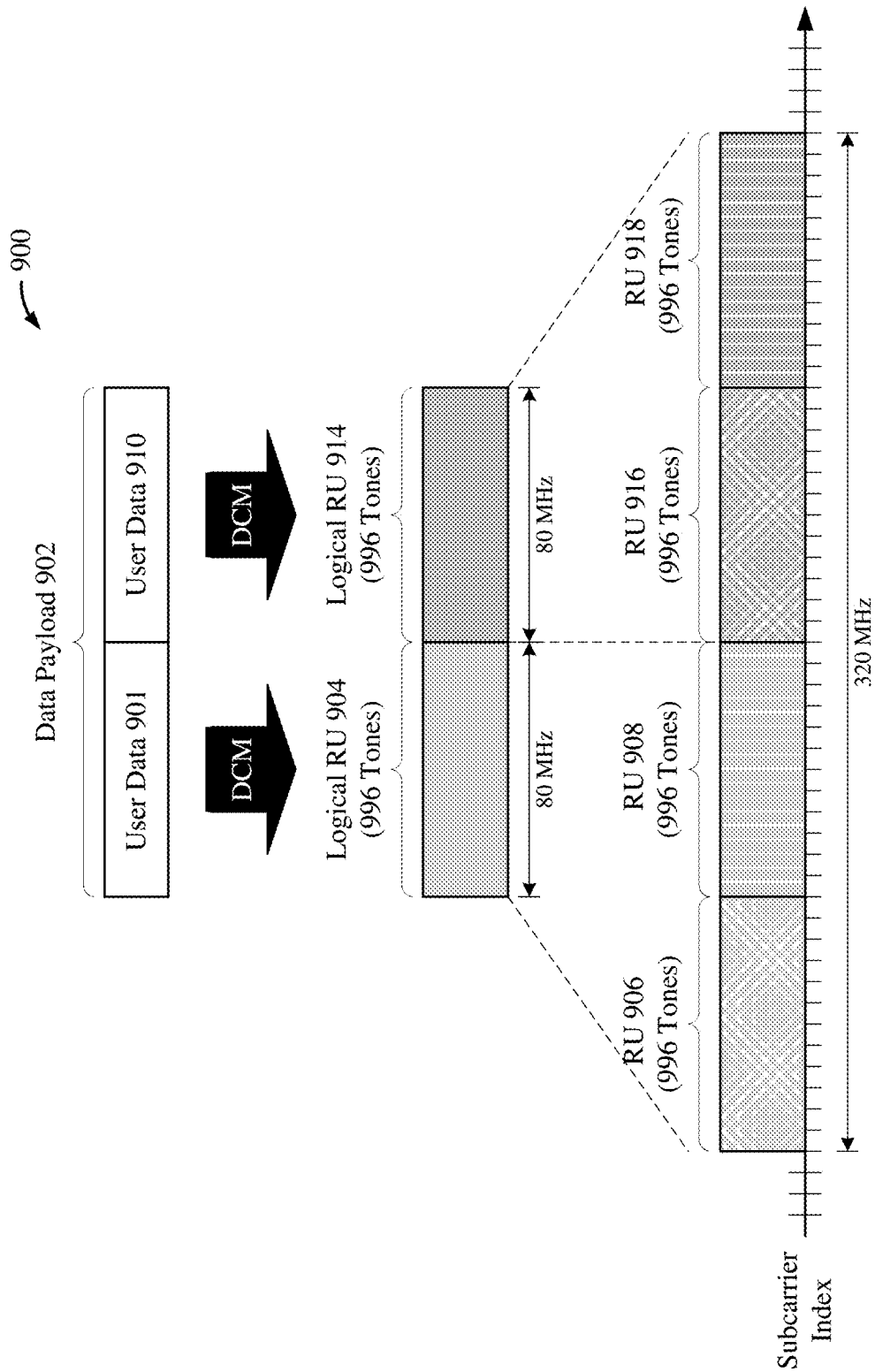
FIG. 9 shows another frequency diagram depicting an example duplicate tone mapping according to some implementations.

FIG. 9 shows another frequency diagram 900 depicting an example duplicate tone mapping according to some implementations. More specifically, FIG. 9 shows an example mapping of a data payload 902 to a set of tones or subcarriers for transmission over a wireless channel. In some implementations, the data payload 902 may be one example of the data field 626 of the PPDU 600 depicted in FIG. 6. In the example of FIG. 9, the data payload includes user data 901 intended for a first user and user data 910 intended for a second user. In the example of FIG. 9, the data payload 902 is shown to include user data 901 and 910 for two users. However, in actual implementations, the data payload 902 may include user data for more than two users.

The first user data 901 is mapped to a logical RU 904 in accordance with a DCM scheme. Similarly, the second user data 910 is mapped to a logical RU 914 in accordance with the DCM scheme. In the example of FIG. 9, each of the logical RUs 904 and 914 includes 996 tones (each spanning a respective 80 MHz bandwidth). However, in actual implementations, each of the logical RUs 904 and 914 may include any suitable number of tones. Moreover, the size of the logical RU 904 may be different than the size of the logical RU 914. As a result of the mapping, the logical RU 904 includes two copies of the first user data 901 and the logical RU 914 includes two copies of the second user data 910.

The logical RU 904 is further mapped to a respective pair of physical RUs 906 and 908. For example, the logical RU 904 may be mapped to a number (N) of subcarrier indices spanning the first RU 906 and also mapped to N subcarrier indices spanning the second RU 908 (N=996 in the example of FIG. 9). As a result, the user data 901 is effectively transmitted 4 times (in the frequency domain) on 2N subcarrier indices spanning the bandwidth of the RUs 906 and 908. Similarly, the logical RU 914 is mapped to a respective pair of physical RUs 916 and 918. For example, the logical RU 914 may be mapped to a number (M) of subcarrier indices spanning the first RU 916 and also mapped to M subcarrier indices spanning the second RU 918 (M=996 in the example of FIG. 9). As a result, the user data 910 is effectively transmitted 4 times (in the frequency domain) on 2M subcarrier indices spanning the bandwidth of the RUs 916 and 918. In the example of FIG. 9, the physical RUs 906, 908, 916, and 918 are transmitted on a 320 MHz-wide channel.

To reduce the PAPR of each duplicate transmission, the transmitting device may apply a 4-part phase rotation [$a_1(1)$, $a_1(2)$, $a_1(3)$, $a_1(4)$] to the frequency-domain signal [$x_1$, $x_{1,DCM}$, $x_1$, $x_{1,DCM}$] representing the first user data 901 and another 4-part phase rotation [$a_2(1)$, $a_2(2)$, $a_2(3)$, $a_2(4)$] to the frequency-domain signal [$x_2$, $x_{2,DCM}$, $x_2$, $x_{2,DCM}$] representing the second user data 910 (as described with reference to Equation 1). In some implementations, the same 4-part phase rotation may be applied to each set of user data 901 and 910 (such that [$a_1(1)$, $a_1(2)$, $a_1(3)$, $a_1(4)$]=[$a_2(1)$, $a_2(2)$, $a_2(3)$, $a_2(4)$]). For example, in some aspects, a 4-part phase rotation [1, 1, −1, 1] may be applied to each of the frequency-domain signals [$x_1$, $x_{DCM}$, $x_1$, $x_{1,DCM}$] and [$x_2$, $x_{2,DCM}$, $x_2$, $x_{2,DCM}$].

Aspects of the present disclosure recognize that an initial release of the IEEE 802.11be amendment supports duplicate transmissions to a single user only (referred to as an "EHT DUP mode"). More specifically, the EHT DUP mode supports duplicate transmissions based on the EHT MU PPDU packet format for transmission to a single user. To support duplicate transmissions for multiple users, new packet designs and signaling are needed to indicate whether each user's data, in the data portion of the PPDU, is transmitted in a DUP mode. In some implementations, the data payload 902 may be transmitted in an aggregated PPDU (A-PPDU), where each user is associated with one sub-PPDU with transmission to a single user in the DUP mode. In such implementations, existing signaling techniques may be reused to indicate whether the user data 901 or 910 is transmitted in a DUP mode in each sub-PPDU of the A-PPDU. In some other implementations, the data payload 902 may be transmitted in an MU PPDU for OFDMA transmission. In such implementations, new signaling techniques are needed to indicate whether the user data 901 or 910 is transmitted in a DUP mode.

Figure 10:
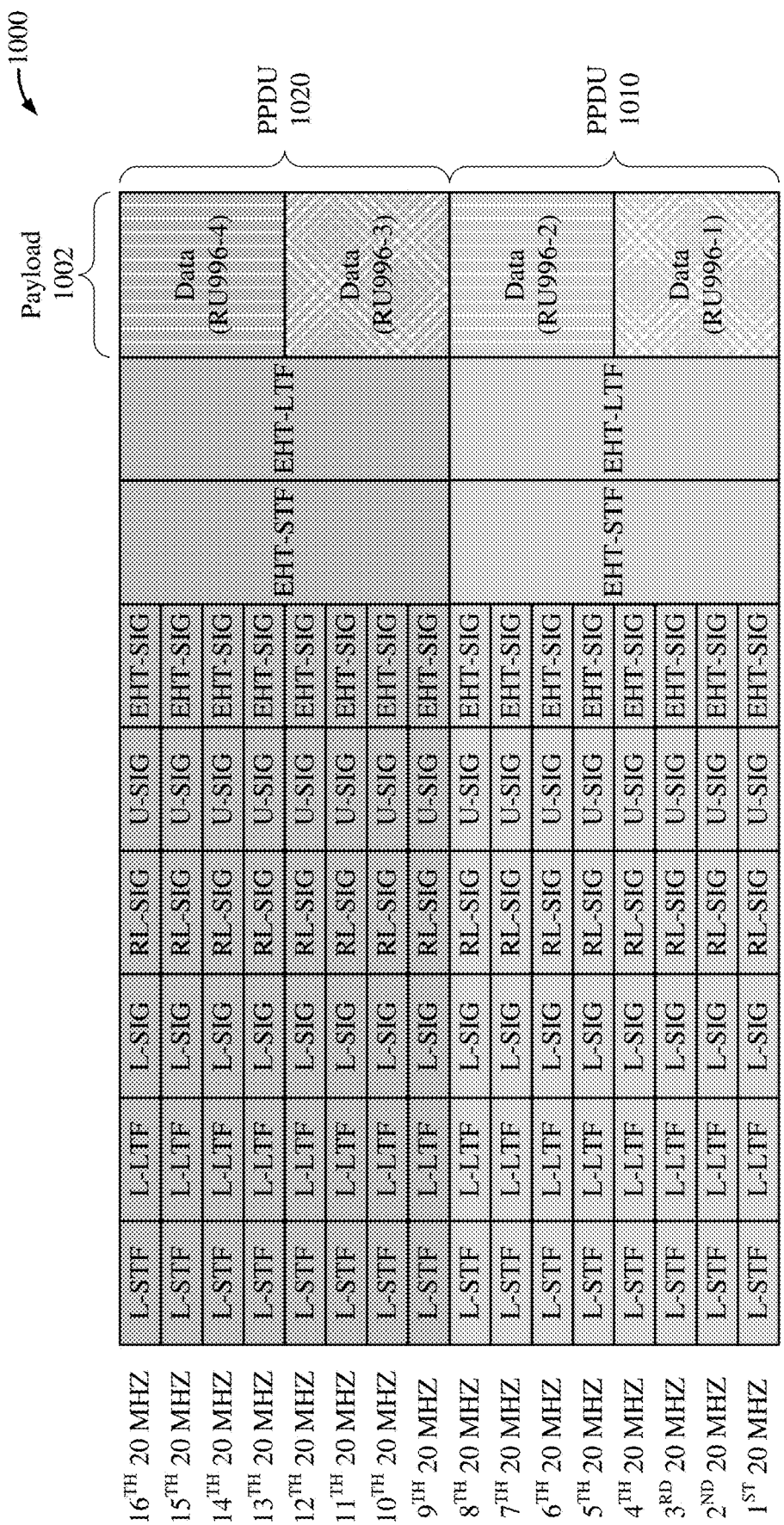
FIG. 10 shows an example frame structure of an aggregated PPDU (A-PPDU) allocated over multiple wireless subchannels according to some implementations.

FIG. 10 shows an example frame structure of an A-PPDU 1000 allocated over multiple wireless subchannels according to some implementations. The A-PPDU 1000 is an aggregate of multiple PPDUs (such as the PPDU 600 of FIG. 6) that are transmitted concurrently on respective subchannels of a shared wireless channel. In the example of FIG. 10, the A-PPDU 1000 is shown to include two PPDUs 1010 and 1020 (also referred to herein as "sub-PPDUs") that are transmitted on respective 160 MHz subchannels of a 320 MHz channel. However, in actual implementations, the A-PPDU 1000 may include any number of PPDUs that can be transmitted over various other bandwidths.

In the example of FIG. 10, each of the PPDUs 1010 and 1020 is a PPDU for transmission to a single user. More specifically, the first PPDU 1010 carries user data for a first user and the second PPDU 1020 carries user data for a second user. In some implementations, the data portion of each PPDU 1010 and 1020 may be transmitted as a duplicate transmission. For example, the user data in the first PPDU 1010 may be mapped, in accordance with a DCM scheme, to a 996-tone RU in a first 80 MHz subchannel (RU996-1) and a duplicate copy of the user data may be mapped, in accordance with the DCM scheme, to a second 996-tone RU in a second 80 MHz subchannel (RU996-2). Similarly, the user data in the second PPDU 1020 may be mapped, in accordance with a DCM scheme, to a 996-tone RU in a third 80 MHz subchannel (RU996-3) and a duplicate copy of the user data may be mapped, in accordance with the DCM scheme, to a fourth 996-tone RU in a fourth 80 MHz subchannel (RU996-4). The data portions of the PPDUs 1010 and 1020 collectively form a payload 1002 of the A-PPDU 1000. In some implementations, the payload 1002 may be one example of the data payload 902 of FIG. 9.

In some implementations, each of the PPDUs 1010 and 1020 may conform with the EHT DUP mode defined by existing versions of the IEEE 802.11 standard. For example, the PPDU type and compression mode subfield of U-SIG may be set to 1 (to indicate an EHT transmission to a single user) and the MCS subfield of the user field in EHT-SIG may be set to 14 for each of the PPDUs 1010 and 1020. As such, no new signaling is needed to indicate that the data portion of each PPDU 1010 and 1020 is transmitted as a duplicate transmission. For example, the first user may determine, based on the value of the PPDU type and compression mode subfield of U-SIG and the value of the MCS subfield of EHT-SIG, whether the PPDU 1010 includes an EHT DUP mode transmission. Similarly, the second user may determine, based on the value of the PPDU type and compression mode subfield of U-SIG and the value of the MCS subfield of EHT-SIG, whether the PPDU 1020 includes an EHT DUP mode transmission.

In some implementations, each sub-PPDU of an A-PPDU may be transmitted over an 80 MHz bandwidth or a 160 MHz bandwidth. Accordingly, the user data in each sub-PPDU may be duplicated on a pair of 484-tone RUs (coinciding with an 80 MHz PPDU bandwidth) or a pair of 996-tone RUs (coinciding with a 160 MHz PPDU bandwidth). This may allow for various combinations of bandwidth "splits" that can support up to 4 users in the A-PPDU such as shown, for example, in Table 1.

TABLE 1

| Aggregated BW | BW Split (From Low to High Frequency) | # Users |
|---|---|---|
| 160 MHz | [80 80] | 2 |
| 320 MHz | [160 160] | 2 |
| (18 Modes) | [160 80 80], [80 160 80], [80 80 160] | 3 |
|  | [80 80 80 80] | 4 |
|  | [x 160 80]*, [x 80 160], [80 x 160], [160 x 80], [160 80 x], [80 160 x]* | 2 |
|  | [x 80 80 80], [80 x 80 80], [80 80 x 80], [80 80 80 x] | 3 |
|  | [80 x 80 x], [x 80 x 80] | 2 |
|  | [80 x x 80] | 2 |

In Table 1, an "x" represents an unused 80 MHz sub-band. For example, the bandwidth split [x 80 160] indicates that the lowest 80 MHz sub-band is unused, the second 80 MHz sub-band is occupied by a sub-PPDU for a first user, and the upper 160 MHz sub-band is occupied by a sub-PPDU for a second user. Aspects of the present disclosure recognize that the actual number of possible bandwidth splits may depend on the hardware limitations of the transmitting device. For example, an AP with two 160 MHz engines may only support up to 2 users in a single A-PPDU (one in the upper 160 MHz bandwidth and one in the lower 160 MHz bandwidth). As such, only the 2-user bandwidth splits may be supported by the AP (excluding the bandwidth splits marked by an asterisk). In some implementations, a 50 nanosecond (ns) cyclic shift delay (CSD) may be applied to the EHT-modulated fields of the PPDU, namely, the EHT-STF, EHT-LTF, and data fields of the sub-PPDU transmitted in the upper bandwidth portion to further reduce the PAPR of the A-PPDU transmission.

Figure 11:
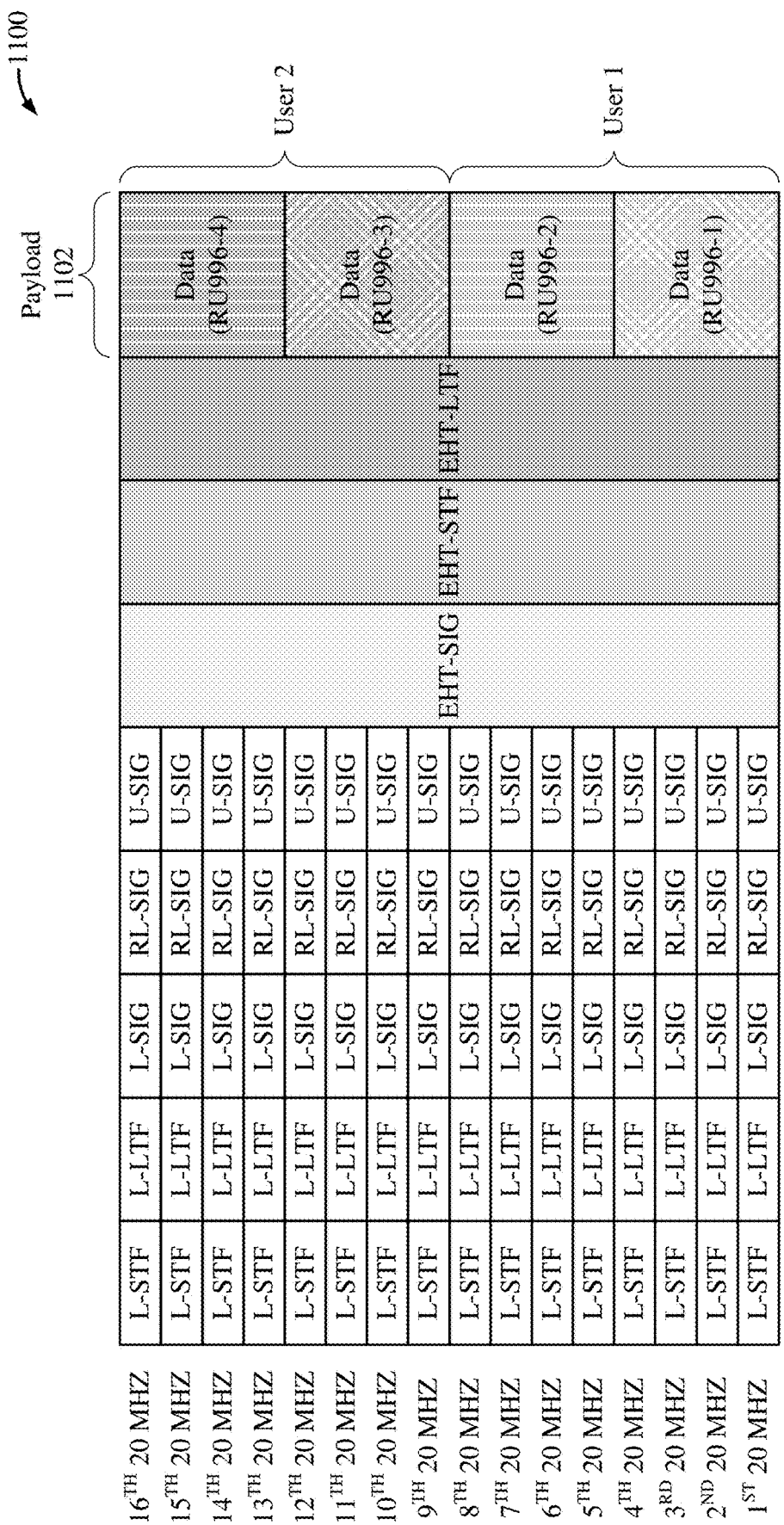
FIG. 11 shows an example frame structure of an MU PPDU allocated over multiple wireless subchannels according to some implementations.

FIG. 11 shows an example frame structure of an MU PPDU 1100 allocated over multiple wireless subchannels according to some implementations. In some implementations, the MU PPDU 1100 may be one example of the PPDU 600 of FIG. 6. In the example of FIG. 11, the MU PPDU 1100 is shown to include a payload 1102 that carries user data for two different users (user 1 and user 2). More specifically, the user data for each user is transmitted on a respective 160 MHz subchannel of a 320 MHz channel. However, in actual implementations, the payload 1102 may include data for any number of users that can be transmitted over various other bandwidths.

In some implementations, the payload 1102 may be one example of the data payload 902 of FIG. 9. Thus, the user data for each user may be transmitted as a duplicate transmission. For example, the user data for user 1 may be mapped, in accordance with a DCM scheme, to a 996-tone RU in a first 80 MHz subchannel (RU996-1) and a duplicate copy of the user data may be mapped, in accordance with the DCM scheme, to a second 996-tone RU in a second 80 MHz subchannel (RU996-2). Similarly, the user data for user 2 may be mapped, in accordance with a DCM scheme, to a 996-tone RU in a third 80 MHz subchannel (RU996-3) and a duplicate copy of the user data may be mapped, in accordance with the DCM scheme, to a fourth 996-tone RU in a fourth 80 MHz subchannel (RU996-4). In some implementations, the user data for any given user of the MU PPDU 1100 may be transmitted over an 80 MHz bandwidth or a 160 MHz bandwidth. Accordingly, the user data in each sub-PPDU may be duplicated on a pair of 484-tone RUs or a pair of 996-tone RUs. This may allow for various combinations of bandwidth splits that can support up to 4 users in the MU PPDU 1100 such as shown, for example, in Table 2.

TABLE 2

| Aggregated BW | BW Split (From Low to High Frequency) | # Users |
|---|---|---|
| 160 MHz | [80 80] | 2 |
| 320 MHz | [160 160] | 2 |
| (15 Modes) | [160 80 80], [80 80 160] | 3 |
|  | [80 80 80 80] | 4 |
|  | [x 80 160], [80 x 160], [160 80 x], [160 80 x] | 2 |
|  | [x 80 80 80], [80 x 80 80], [80 80 x 80], [80 80 80 x] | 3 |
|  | [80 x 80 x], [x 80 x 80] | 2 |
|  | [80 x x 80] | 2 |

As described with reference to FIG. 7, EHT-SIG is duplicated per content channel in the MU PPDU 1100. More specifically, a first content channel carries the signaling information for all odd-numbered 20 MHz subchannels and a second content channel carries the signaling information for all even-numbered 20 MHz subchannels. As such, only 2 copies of the same RU allocation subfields and user fields are transmitted on any 80 MHz segment of the wireless channel. Aspects of the present disclosure recognize that a 4× power increase is achievable by applying DCM to the encoding of EHT-SIG. For example, the modulation and coding scheme associated with the MCS index 15 (MCS15), as defined by existing versions of the IEEE 802.11 standard, combines DCM with the modulation and coding scheme associated with rate ½ coding and binary phase-shift keying (BPSK) modulation. Thus, in some implementations, EHT- SIG may be modulated in accordance with MCS15. In such implementations, the EHT-SIG MCS subfield of U-SIG may be set to 3 (to indicate an EHT-MCS 15).

Aspects of the present disclosure further recognize that new signaling is needed to indicate that the user data in the payload 1102 is transmitted in a DUP mode. More specifically, each user must determine the bandwidth allocated for its respective data (also referred to as "bandwidth split information") and how the data is mapped to a number of tones (or subcarriers) or RUs spanning the bandwidth (also referred to as "duplicate transmission information"). In some implementations, one or more fields or subfields of the existing OFDMA MU PPDU format may be reused to carry the new signaling. For example, one or more values of the existing fields or subfields may be reinterpreted to convey the bandwidth split information and the duplicate transmission information. In some other implementations, new fields or subfields may be added to an OFDMA MU PPDU to carry the new signaling. For example, the OFDMA MU PPDU may be configured in accordance with a new "OFDMA DUP mode."

Figure 12:
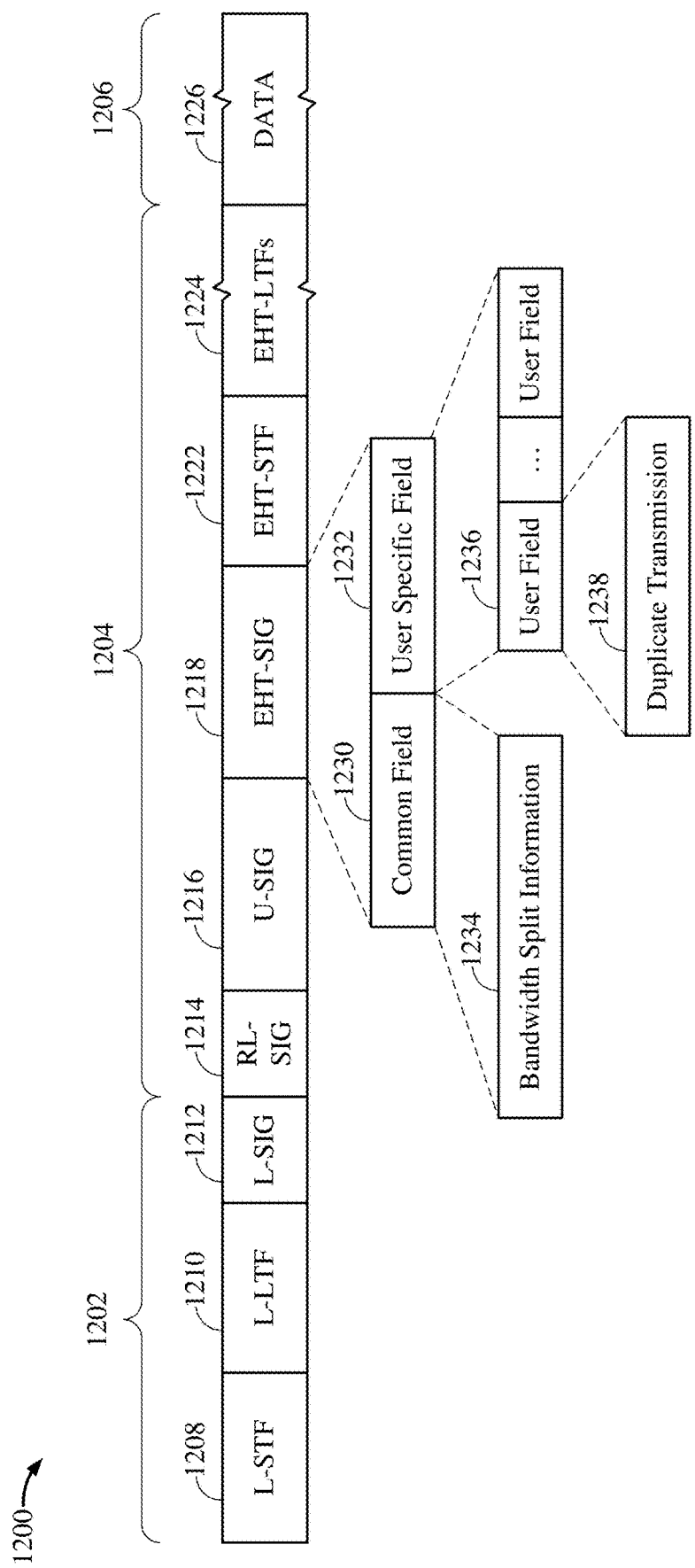
FIG. 12 shows an example PPDU usable for communications between an AP and multiple STAs according to some implementations.

FIG. 12 shows an example PPDU 1200 usable for communications between an AP and multiple STAs according to some implementations. The PPDU 1200 includes a PHY preamble including a first portion 1202 and a second portion 1204. The PPDU 1200 may further include a PHY payload 1206 after the preamble, for example, in the form of a PSDU carrying a data field 1226. In some implementations, the PPDU 1200 may be one example of the PPDU 600 of FIG. 6. More specifically, the PPDU 1200 may be an OFDMA MU PPDU. Thus, the data field 1226 may carry user data for multiple users.

The first portion 1202 of the PHY preamble includes L-STF 1208, L-LTF 1210, and L-SIG 1212. The second portion 1204 of the PHY preamble includes an RL-SIG 1214, a U-SIG 1216, an EHT-SIG 1218, an EHT-STF 1222, and a number of EHT-LTFs 1224. The EHT-SIG 1218 further includes a common field 1230 and a user specific field 1232. The common field 1230 carries information common to each user associated with the PPDU 1200. In the example of FIG. 12, the user specific field 1232 includes multiple user fields 1236 each carrying information specific for a respective user associated with the PPDU 1200. For example, each of the user fields 1236 may carry signaling for interpreting or recovering respective user data transmitted in the data field 1226. In some implementations, the user data for at least one of the users may be transmitted in a DUP mode.

Figure 13:
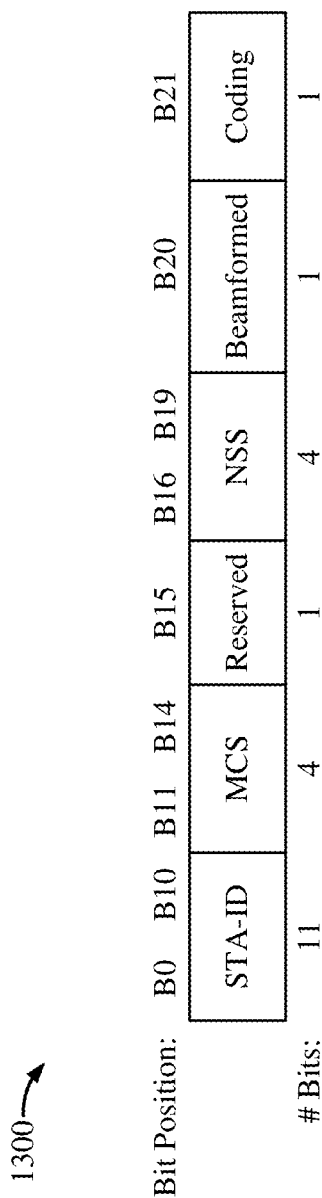
FIG. 13 shows a user field for a PPDU formatted in accordance with an existing PPDU format.

In some implementations, each user field 1236 may carry duplicate transmission information 1238 indicating whether the respective user data is transmitted in a DUP mode. In some aspects, the duplicate transmission information 1238 may be carried in an MCS subfield of the user field 1236. FIG. 13 shows a user field 1300 for a PPDU formatted in accordance with an existing PPDU format. More specifically, the user field 1300 conforms to the user field format for a non-MU-MIMO allocation defined by an initial release of the IEEE 802.11be amendment of the IEEE 802.11 standard. In some implementations, the user field 1300 may be one example of the user field 1236 of FIG. 12. As shown in FIG. 13, the user field 1300 includes an MCS subfield in bit positions B11-B14. The value of the MCS subfield maps to an MCS index in an MCS table which indicates the modulation and coding scheme that is applied to the user data associated with the user field 1300.

As described above with reference to FIG. 10, the MCS index 14 (MCS14) is used to indicate an EHT DUP mode transmission in an EHT MU PPDU for transmission to a single user. In some implementations, the MCS index 14 may be reused to indicate that a user's data in the OFDMA MU PPDU 1200 is transmitted in a DUP mode. For example, the MCS subfield of the user field 1300 may be set to 14 to indicate that the respective user data is transmitted in a DUP mode. Because each user field 1236 has its own MCS subfield, the value of the MCS subfield applies only to the user data for a particular user. As such, some users associated with the PPDU 1200 may be in a DUP mode while some other users associated with the PPDU 1200 may be in a non-DUP mode. For example, the MCS subfield of a first user field 1236 of the user specific field 1232 may be set to 14 (indicating a DUP mode transmission) while the MCS subfield of a second user field 1236 of the user specific field 1232 may be set to an MCS index other than 14 (indicating a non-DUP mode transmission).

Figure 14:
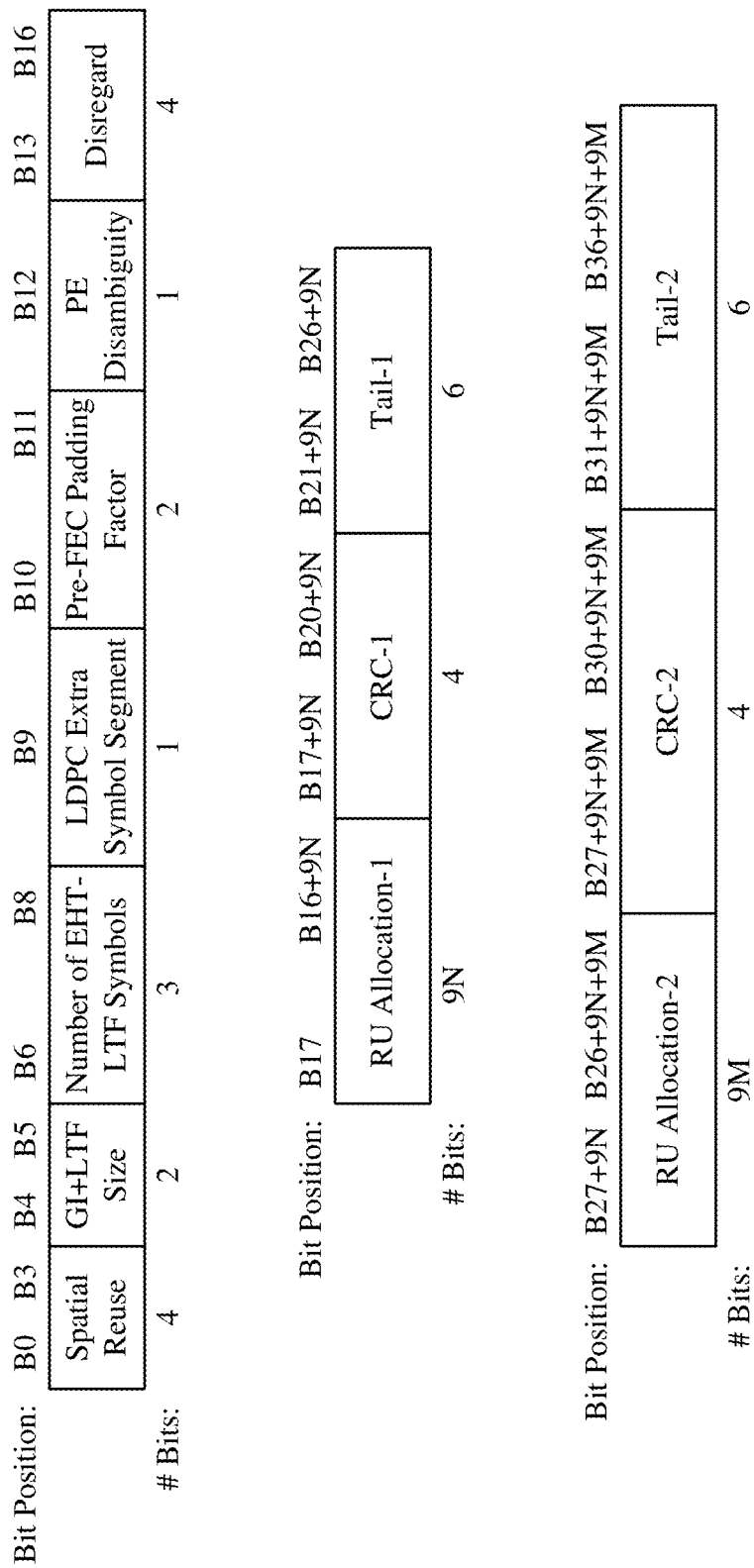
FIG. 14 shows a common field for a PPDU formatted in accordance with an existing PPDU format.

In some implementations, the common field 1230 may carry bandwidth split information 1234 indicating the bandwidth allocated for each user's data. In some aspects, the bandwidth split information 1234 may be carried in an RU allocation subfield of the common field 1230. FIG. 14 shows a common field 1400 for a PPDU formatted in accordance with an existing PPDU format. More specifically, the common field 1400 conforms to the common field format for an OFDMA transmission defined by an initial release of the IEEE 802.11be amendment of the IEEE 802.11 standard. In some implementations, the common field 1400 may be one example of the common field 1230 of FIG. 12. As shown in FIG. 14, the common field 1400 includes one or more RU allocation subfields in bit positions from B17 to B16+9N and from B27+9N to B26+9N+9M, where N=2 and M=2 for the 160 MHz PPDU bandwidth, and N=2 and M=6 for the 320 MHz PPDU bandwidth. The values of the RU allocation subfields indicate an RU assignment for each user field 1236 of the user specific field 1232 and the placement of the RUs in the frequency domain.

Existing versions of the IEEE 802.11 standard define a number of RUs and multiple RUs (MRUs) of various sizes that map to contiguous tones or subcarriers spanning a frequency bandwidth. For example, a 996-tone RU maps to an 80 MHz bandwidth and a 2×996-tone MRU maps to a 160 MHz bandwidth. In some implementations, a user may reinterpret the information in the RU allocation subfields when the duplicate transmission information 1238 indicates a DUP mode. For example, if a 996-tone RU is assigned to a user in DUP mode, the user may interpret the RU assignment to indicate that its user data is mapped to a first 484-tone RU, in accordance with a DCM scheme, and a duplicate copy of the user data is mapped to a second 484-tone RU, in accordance with the DCM scheme, in an 80 MHz bandwidth. On the other hand, if a 2×996-tone RU is assigned to a user in DUP mode, the user may interpret the RU assignment to indicate that its user data is mapped to a first 996-tone RU, in accordance with a DCM scheme, and a duplicate copy of the user data is mapped to a second 996-tone RU, in accordance with the DCM scheme, in a 160 MHz bandwidth (such as described with reference to FIGS. 8 and 9).

In some other implementations, one or more Disregard values of the RU allocation subfields (such as values 304-511) may be repurposed to indicate the RU assignment for an OFDMA user in a DUP mode. For example, a first value between 304-511 that is a multiple of 8 (such as 304) may be used to indicate that two adjacent 484-tone RUs (of total 80 MHz bandwidth within an MU PPDU of 160 MHz or larger bandwidth) are assigned to a user in DUP mode. Such user may interpret the RU assignment to indicate that its user data is mapped to a first 484-tone RU, in accordance with a DCM scheme, and a duplicate copy of the user data is mapped to a second 484-tone RU, in accordance with the DCM scheme, in an 80 MHz bandwidth. Further, a second value between 304-511 that is a multiple of 8 (such as 312) may be used to indicate two adjacent 996-tone RUs (of total 160 MHz bandwidth within an MU PPDU of 320 MHz or larger bandwidth) are assigned to a user in DUP mode. Such user may interpret the RU assignment to indicate that its user data is mapped to a first 996-tone RU, in accordance with a DCM scheme, and a duplicate copy of the user data is mapped to a second 996-tone RU, in accordance with the DCM scheme, in a 160 MHz bandwidth (such as described with reference to FIGS. 8 and 9).

B2 of U-SIG-2), or a combination of both. FIG. 16 shows a U-SIG 1600 for a PPDU formatted in accordance with an existing PPDU format. More specifically, U-SIG 1600 conforms to the U-SIG format for an EHT MU PPDU defined by an initial release of the IEEE 802.11be amendment of the IEEE 802.11 standard. In some implementations, U-SIG 1600 may be one example of U-SIG 1516 of FIG. 15. As shown in FIG. 16, U-SIG 1600 includes a UL/DL field in bit position B6 of a first U-SIG symbol (U-SIG-1) and a PPDU type and compression mode field in bit positions B0 and B1 of a second U-SIG symbols (U-SIG-2). The values of the UL/DL field and the PPDU type and compression mode field indicate a format of the PPDU. Various states of the UL/DL field and the PPDU type and compression mode field are summarized in Table 3.

TABLE 3

| U-SIG Fields | | Description | | | | |
|---|---|---|---|---|---|---|
| UL/DL | PPDU Type and Compression Mode | EHT PPDU Format | EHT-SIG Present? | RU Allocation Subfield(s) Present? | # Users in the PPDU | Note |
| 0 (DL) | 0 | EHT MU | Yes | Yes | ≥1 | OFDMA |
| | 1 | EHT MU | Yes | No | 1 | Transmission to a single user or NDP |
| | 2 | EHT MU | Yes | No | >1 | Non-OFDMA MU-MIMO |
| | 3 | — | — | — | — | Validate |

Figure 15:
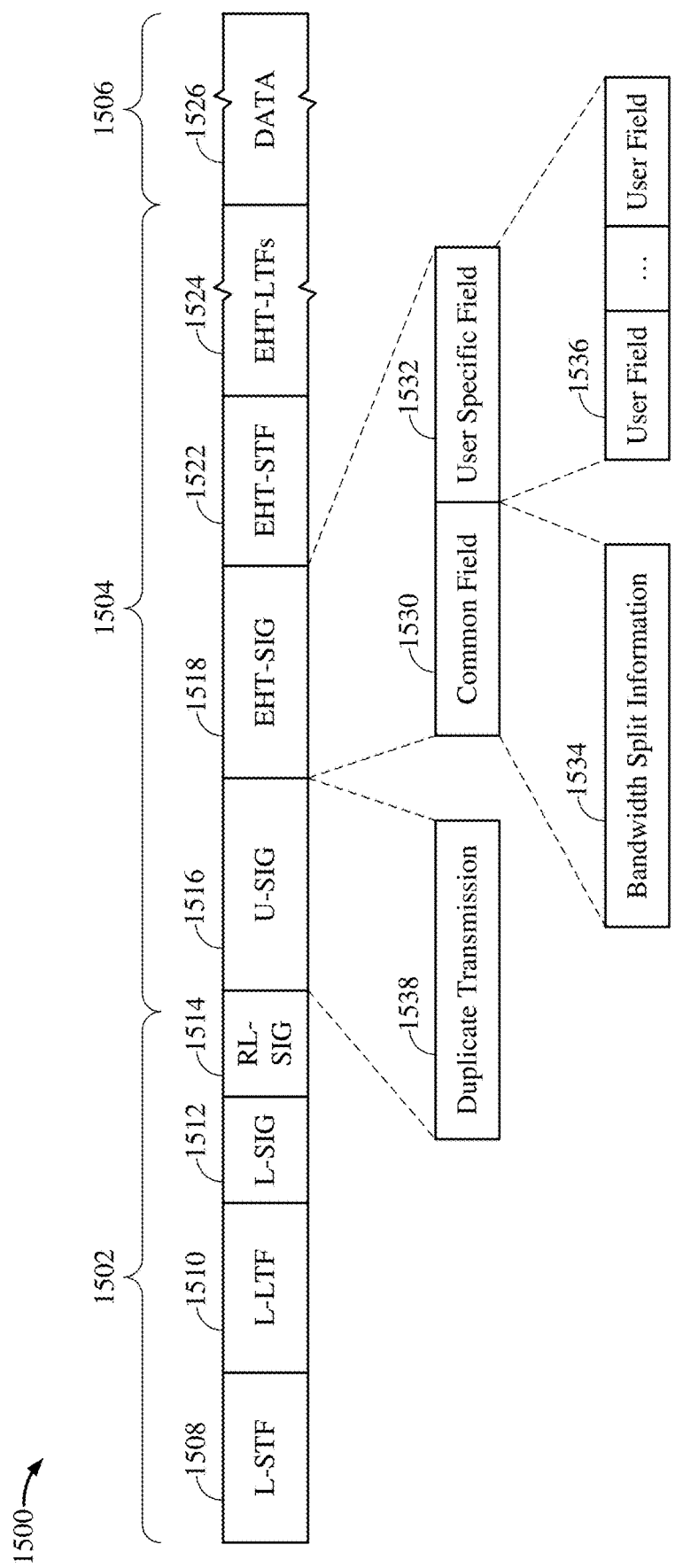
FIG. 15 shows another example PPDU usable for communications between an AP and multiple STAs according to some implementations.
Figure 16:
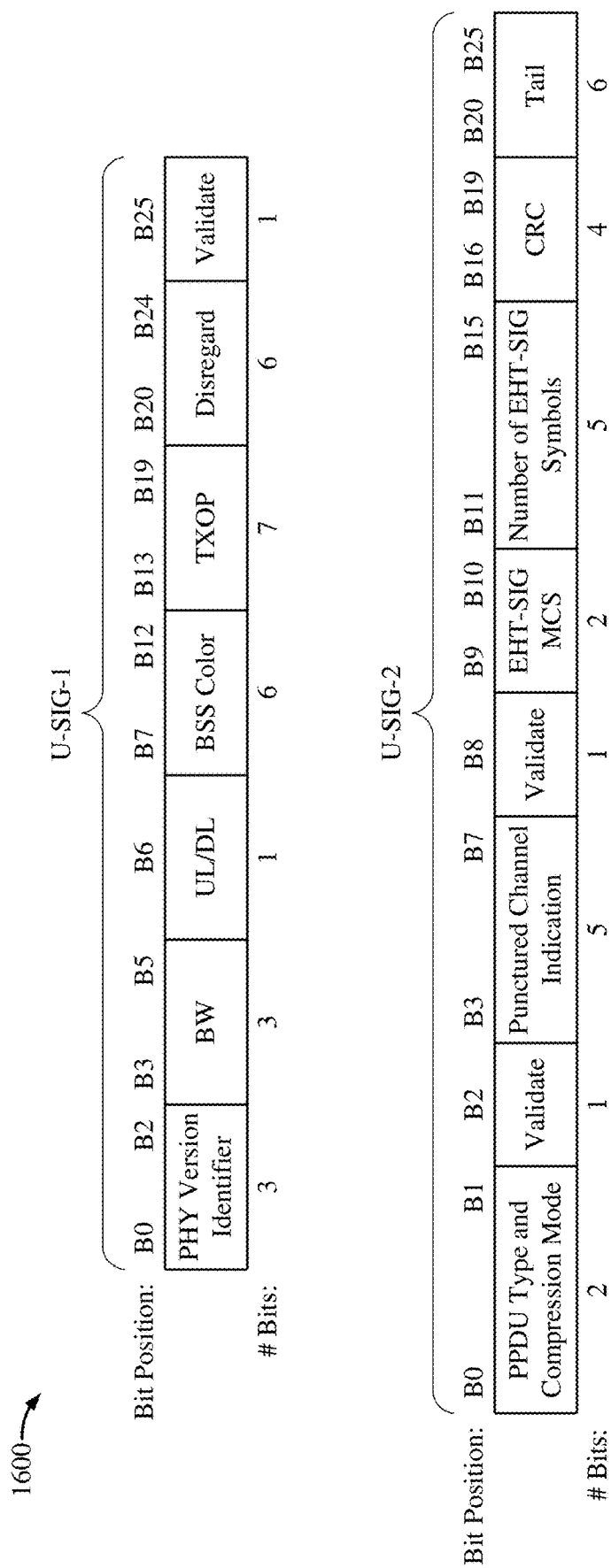
FIG. 16 shows a universal signal field (U-SIG) for a PPDU formatted in accordance with an existing PPDU format.

FIG. 15 shows another example PPDU 1500 usable for communications between an AP and multiple STAs according to some implementations. The PPDU 1500 includes a PHY preamble including a first portion 1502 and a second portion 1504. The PPDU 1500 may further include a PHY payload 1506 after the preamble, for example, in the form of a PSDU carrying a data field 1526. In some implementations, the PPDU 1500 may be one example of the PPDU 600 of FIG. 6. More specifically, the PPDU 1500 may be an OFDMA MU PPDU. Thus, the data field 1526 may carry user data for multiple users.

The first portion 1502 of the PHY preamble includes L-STF 1508, L-LTF 1510, and L-SIG 1512. The second portion 1504 of the PHY preamble includes an RL-SIG 1514, a U-SIG 1516, an EHT-SIG 1518, an EHT-STF 1522, and a number of EHT-LTFs 1524. The EHT-SIG 1518 further includes a common field 1530 and a user specific field 1532. The common field 1530 carries information common to each user associated with the PPDU 1500. In the example of FIG. 15, the user specific field 1532 includes multiple user fields 1536 each carrying information specific for a respective user associated with the PPDU 1500. For example, each of the user fields 1536 may carry signaling for interpreting or recovering respective user data transmitted in the data field 1526. In some implementations, the user data for at least one of the users may be transmitted in a DUP mode.

In some implementations, U-SIG 1516 may carry duplicate transmission information 1538 indicating whether the user data is transmitted in a DUP mode. In some aspects, the duplicate transmission information 1538 may be carried in a PPDU type and compression mode field of U-SIG 1516, a 1-bit Validate field immediately following the PPDU type and compression mode field of U-SIG 1516 (in bit position As shown in Table 3, the PPDU type and compression mode field can have 1 of 4 values. However, in current versions of the IEEE 802.11 standard, only 3 of the values are used for a DL PPDU (UL/DL=0). Specifically, the PPDU type and compression mode value "3" represents a reserved (Validate) state. Reserved states represent unused states that are reserved for future implementations of the IEEE 802.11 standard. In accordance with the EHT MU PPDU format, reserved states are further subdivided into Validate state and Disregard states. Validate states are used to indicate whether a STA should continue receiving the PPDU whereas disregard states may be ignored by the receiving STA. In some implementations, the PPDU type and compression mode value "3" may be repurposed to indicate a new OFDMA DUP mode. In such implementations, the PPDU 1500 may be specifically tailored for duplicate transmissions to multiple users. For example, all user data in the data field 1526 may be transmitted in a DUP mode.

In some aspects, the 1-bit Validate field (in bit position B2 of U-SIG-2) immediately following the PPDU type and compression mode field in U-SIG 1516 may be repurposed as a duplicate transmission (DT) indication bit. In some implementations, the DT indication bit may be set to 0 to indicate duplicate transmission to multiple users. For example, when the value of the DT indication bit is equal to 0, all user data in the data field 1526 may be transmitted in a DUP mode. In some other aspects, when the 1-bit Validate field (B2 of U-SIG-2) of U-SIG 1516 is set to 0, one of the four values in the PPDU type and compression mode field may be used to indicate duplicate transmission to multiple users. For example, when the value of the 1-bit Validate field is equal to 0 and the PPDU type and compression mode field is set to a particular value, all user data in the data field 1526 may be transmitted in a DUP mode.

In some implementations, the common field 1530 may carry bandwidth split information 1534 indicating the bandwidth allocated for each user's data. In some aspects, the bandwidth split information 1534 may indicate a bandwidth split among the users associated with the PPDU 1500. As shown in Table 2, only a limited number of bandwidth splits may be supported for up to 4 users of the PPDU 1500. More specifically, when the bandwidth of the PPDU 1500 is equal to 160 MHz, only 1 bandwidth split is supported (for 2 users). On the other hand, when the bandwidth of the PPDU 1500 is equal to 320 MHz, a total of 15 bandwidth splits are supported (for 2-4 users). As such, only 4 bits of bandwidth split information 1534 are needed to convey each of the possible bandwidth splits. Thus, in some aspects, the bandwidth split information 1534 may be carried in a 4-bit bandwidth split field. With reference for example to FIG. 14, the bandwidth split field may replace the RU allocation subfields of the common field 1400. As a result, the OFDMA DUP mode may significantly reduce the signaling overhead of the PPDU 1500.

In some implementations, EHT-SIG 1518 may conform to a new content channel structure when the PPDU 1500 is configured in the OFDMA DUP mode. More specifically, the same EHT-SIG fields and values may be duplicated across all 20 MHz sub-bands spanning an 80 MHz bandwidth (rather than being split between odd and even content channels as described with reference to FIG. 7). As such, 4 copies of the EHT-SIG fields and values are transmitted on each 80 MHz segment of the wireless channel, resulting in a 4× power increase in the transmission of EHT-SIG 1518. In some implementations, EHT-SIG 1518 may be further modulated in accordance with MCS0 (which includes rate ½ coding and BPSK modulation). In such implementations, the EHT-SIG MCS subfield of U-SIG (coinciding with bit positions B9 and B10 of U-SIG-2 in FIG. 16) may be set to 0 (to indicate an MCS index equal to 0).

Figure 17A:
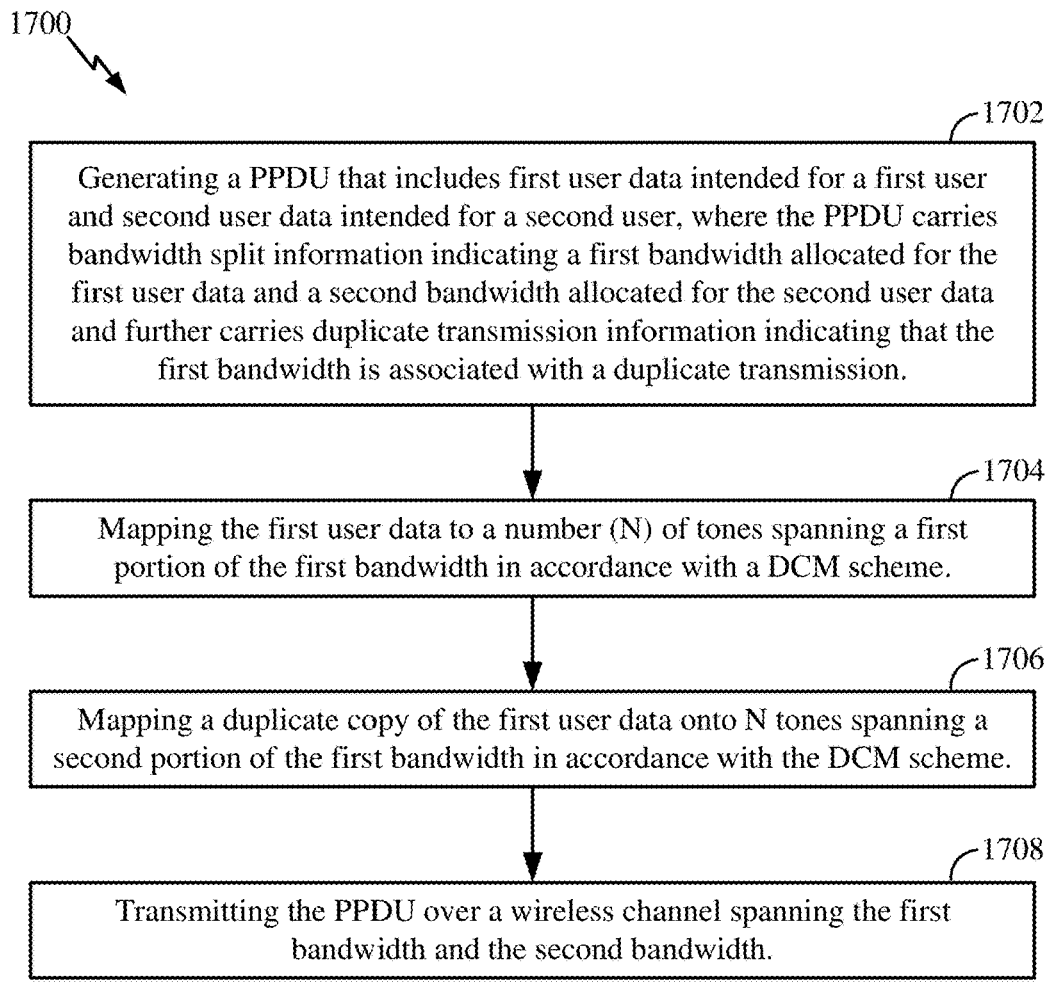
FIG. 17A shows a flowchart illustrating an example process for wireless communication that supports MU duplicate transmission according to some implementations.

FIG. 17A shows a flowchart illustrating an example process 1700 for wireless communication that supports MU duplicate transmission according to some implementations. In some implementations, the process 1700 may be performed by a wireless communication device operating as or within an AP, such as one of the APs 102 or 502 described above with reference to FIGS. 1 and 5A, respectively.

In some implementations, the process 1700 begins in block 1702 with generating a PPDU that includes first user data intended for a first user and second user data intended for a second user, where the PPDU carries bandwidth split information indicating a first bandwidth allocated for the first user data and a second bandwidth allocated for the second user data and further carries duplicate transmission information indicating that the first bandwidth is associated with a duplicate transmission. In block 1704, the process 1700 proceeds with mapping the first user data to a number (N) of tones spanning a first portion of the first bandwidth in accordance with a DCM scheme. In block 1706, the process 1700 proceeds with mapping a duplicate copy of the first user data onto N tones spanning a second portion of the first bandwidth in accordance with the DCM scheme. In block 1708, the process 1700 proceeds with transmitting the PPDU over a wireless channel spanning the first bandwidth and the second bandwidth.

In some implementations, the PPDU may be an MU PPDU having a PHY preamble that includes a U-SIG followed by a non-legacy signal field, where the bandwidth split information and the duplicate transmission information are carried in the non-legacy signal field of the PHY preamble. In some aspects, the bandwidth split information may be indicated by a value of an RU allocation subfield of a common field of the non-legacy signal field, where the common field carries information common to each user associated with the PPDU. In some aspects, the indication that the first bandwidth is associated with a duplicate transmission may be carried in an MCS subfield of a first user field of the non-legacy signal field that carries information specific to the first second user. In some aspects, the MCS subfield of the first user field may be set to an MCS index equal to 14. In some aspects, U-SIG may include an MCS subfield carrying information indicating an MCS associated with the non-legacy signal field, where the MCS subfield is set to a value representing rate ½ coding, BPSK modulation, and DCM.

In some other implementations, the PPDU may be an MU PPDU having a PHY preamble that includes a U-SIG followed by a non-legacy signal field, where the duplicate transmission information is carried in U-SIG and the bandwidth split information is carried in the non-legacy signal field of the PHY preamble. In some aspects, the duplicate transmission information may be indicated based on a value of a duplicate transmission indication bit in U-SIG. In some other aspects, the duplicate transmission information may be indicated by a value of a PPDU type and compression mode field of U-SIG. Still further, in some aspects, the duplicate transmission information may be further indicated based on a value of a Validate field of U-SIG. In some aspects, the bandwidth split information may be indicated by a value of a bandwidth split field of the non-legacy signal field. In some aspects, U-SIG may include an MCS subfield carrying information indicating an MCS associated with the non-legacy signal field, where the MCS subfield is set to a value representing rate ½ coding and BPSK modulation.

Figure 17B:
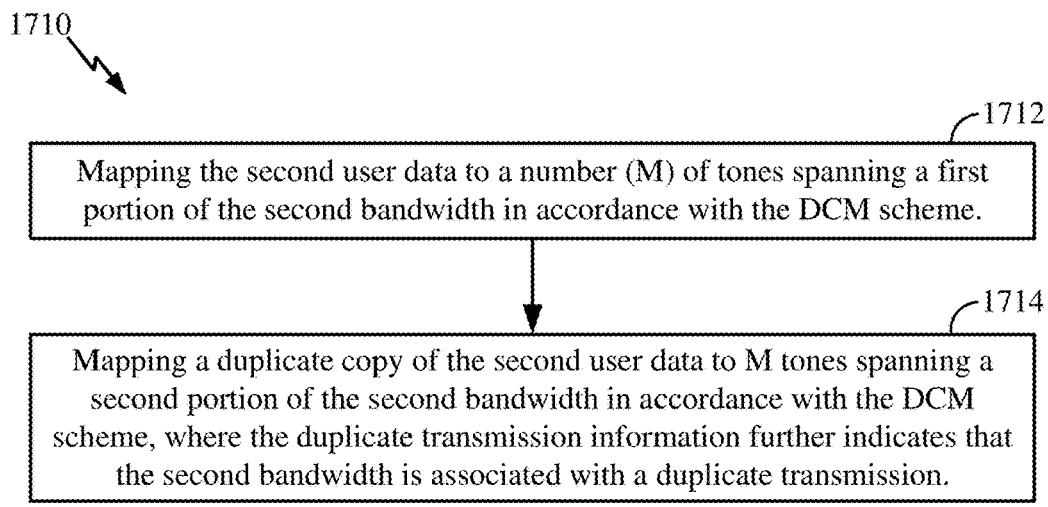
FIG. 17B shows a flowchart illustrating an example process for wireless communication that supports MU duplicate transmission according to some implementations.

FIG. 17B shows a flowchart illustrating an example process 1710 for wireless communication that supports MU duplicate transmission according to some implementations. In some implementations, the process 1710 may be performed by a wireless communication device operating as or within an AP, such as one of the APs 102 or 502 described above with reference to FIGS. 1 and 5A, respectively.

With reference for example to FIG. 17A, the process 1710 may begin, in block 1712, after the generation of the PPDU in block 1702 of the process 1700 and before the transmission of the PPDU in block 1708. In block 1712, the process 1710 begins by mapping the second user data to a number (M) of tones spanning a first portion of the second bandwidth in accordance with the DCM scheme. In block 1714, the process 1710 proceeds with mapping a duplicate copy of the second user data to M tones spanning a second portion of the second bandwidth in accordance with the DCM scheme, where the duplicate transmission information further indicates that the second bandwidth is associated with a duplicate transmission. In some implementations, the PPDU may be an MU PPDU having a PHY preamble that includes a U-SIG followed by a non-legacy signal field, where the indication that the second bandwidth is associated with a duplicate transmission is carried in an MCS subfield of a user field of the non-legacy signal field carrying information specific to the second user.

Figure 18A:
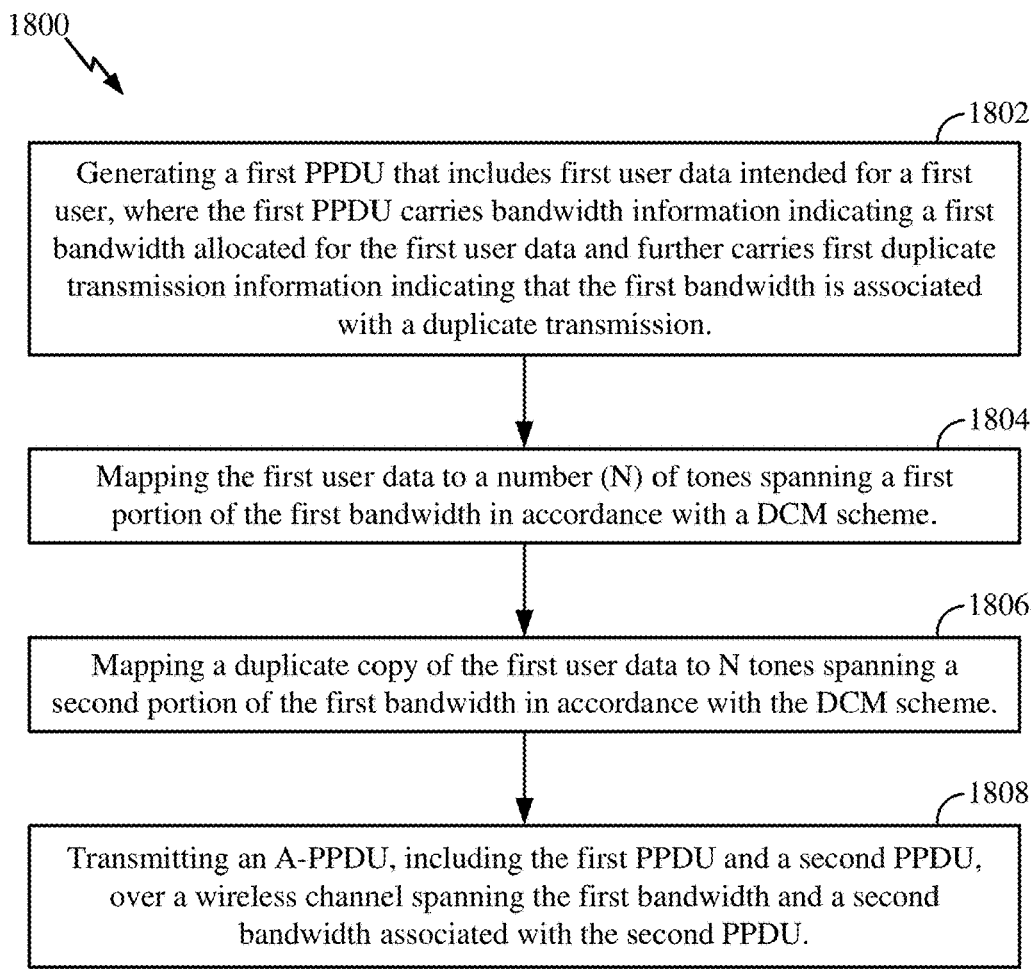
FIG. 18A shows a flowchart illustrating an example process for wireless communication that supports MU duplicate transmission according to some implementations.

FIG. 18A shows a flowchart illustrating an example process 1800 for wireless communication that supports MU duplicate transmission according to some implementations. In some implementations, the process 1800 may be performed by a wireless communication device operating as or within an AP, such as one of the APs 102 or 502 described above with reference to FIGS. 1 and 5A, respectively.

In some implementations, the process 1800 begins in block 1802 with generating a first PPDU that includes first user data intended for a first user, where the first PPDU carries bandwidth information indicating a first bandwidth allocated for the first user data and further carries first duplicate transmission information indicating that the first bandwidth is associated with a duplicate transmission. In block 1804, the process 1800 proceeds with mapping the first user data to a number (N) of tones spanning a first portion of the first bandwidth in accordance with a DCM scheme. In block 1806, the process 1800 proceeds with mapping a duplicate copy of the first user data to N tones spanning a second portion of the first bandwidth in accordance with the DCM scheme. In block 1808, the process 1800 proceeds with transmitting an A-PPDU, including the first PPDU and a second PPDU, over a wireless channel spanning the first bandwidth and a second bandwidth associated with the second PPDU. In some implementations, the first PPDU may be formatted in accordance with a non-legacy MU PPDU format for transmission to a single user. In such implementations, the indication that the first bandwidth is associated with a duplicate transmission may be carried in an MCS subfield of a PHY preamble of the first PPDU.

Figure 18B:
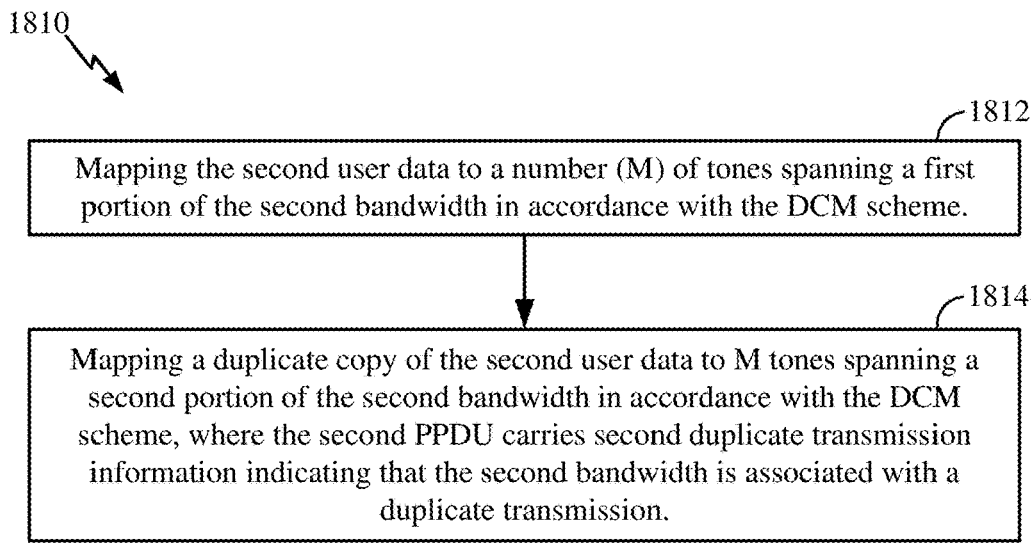
FIG. 18B shows a flowchart illustrating an example process for wireless communication that supports MU duplicate transmission according to some implementations.

FIG. 18B shows a flowchart illustrating an example process 1810 for wireless communication that supports MU duplicate transmission according to some implementations. In some implementations, the process 1810 may be performed by a wireless communication device operating as or within an AP, such as one of the APs 102 or 502 described above with reference to FIGS. 1 and 5A, respectively.

With reference for example to FIG. 18A, the process 1810 may begin, in block 1812, after the generation of the first PPDU in block 1802 of the process 1800 and before the transmission of the A-PPDU in block 1808. In block 1812, the process 1810 begins by mapping the second user data to a number (M) of tones spanning a first portion of the second bandwidth in accordance with the DCM scheme. In block 1814, the process 1810 proceeds with mapping a duplicate copy of the second user data to M tones spanning a second portion of the second bandwidth in accordance with the DCM scheme, where the second PPDU carries second duplicate transmission information indicating that the second bandwidth is associated with a duplicate transmission. In some implementations, the PPDU may be an MU PPDU having a PHY preamble that includes a U-SIG followed by a non-legacy signal field, where the indication that the second bandwidth is associated with a duplicate transmission is carried in an MCS subfield of a user field of the non-legacy signal field carrying information specific to the second user. In some implementations, the second PPDU may be formatted in accordance with a non-legacy MU PPDU format for transmission to a single user. In such implementations, the indication that the second bandwidth is associated with a duplicate transmission may be carried in an MCS subfield of a PHY preamble of the second PPDU.

Figure 19:
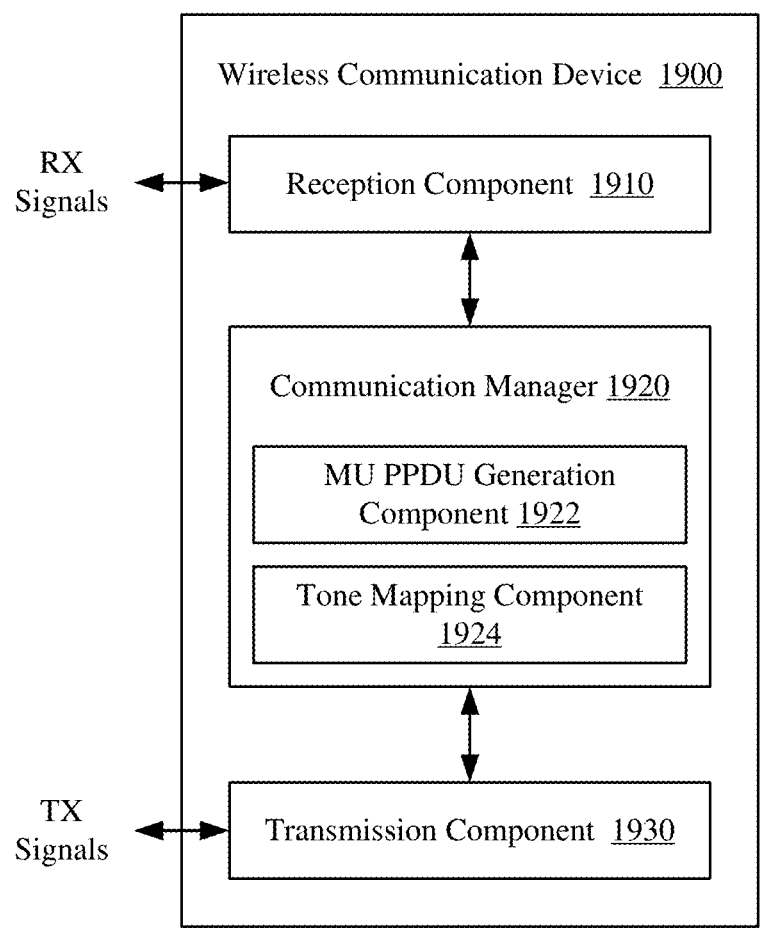
FIG. 19 shows a block diagram of an example wireless communication device according to some implementations.

FIG. 19 shows a block diagram of an example wireless communication device 1900 according to some implementations. In some implementations, the wireless communication device 1900 is configured to perform any of the processes 1700 or 1710 described above with reference to FIGS. 17A and 17B. The wireless communication device 1900 can be an example implementation of the wireless communication device 400 described above with reference to FIG. 4. For example, the wireless communication device 1900 can be a chip, SoC, chipset, package or device that includes at least one processor and at least one modem (for example, a Wi-Fi (IEEE 802.11) modem or a cellular modem).

The wireless communication device 1900 includes a reception component 1910, a communication manager 1920, and a transmission component 1930. The communication manager 1920 further includes an MU PPDU generation component 1922 and a tone mapping component 1924. Portions of one or more of the components 1922 and 1924 may be implemented at least in part in hardware or firmware. In some implementations, at least some of the components 1922 or 1924 are implemented at least in part as software stored in a memory (such as the memory 408). For example, portions of one or more of the components 1922 and 1924 can be implemented as non-transitory instructions (or "code") executable by a processor (such as the processor 406) to perform the functions or operations of the respective component.

The reception component 1910 is configured to receive RX signals, over a wireless channel, from one or more other wireless communication devices. The communication manager 1920 is configured to control or manage communications with the one or more other wireless communication devices. In some implementations, the MU PPDU generation component 1922 may generate a PPDU that includes first user data intended for a first user and second user data intended for a second user, where the PPDU carries bandwidth split information indicating a first bandwidth allocated for the first user data and a second bandwidth allocated for the second user data and further carries duplicate transmission information indicating that the first bandwidth is associated with a duplicate transmission; and the tone mapping component 1924 may map the first user data to a number (N) of tones spanning a first portion of the first bandwidth in accordance with a DCM scheme, and map a duplicate copy of the first user data to N tones spanning a second portion of the first bandwidth in accordance with the DCM scheme. The transmission component 1930 is configured to transmit TX signals, over the wireless channel, to one or more other wireless communication devices. In some implementations, the transmission component 1930 may transmit the PPDU over a wireless channel spanning the first bandwidth and the second bandwidth.

Figure 20:
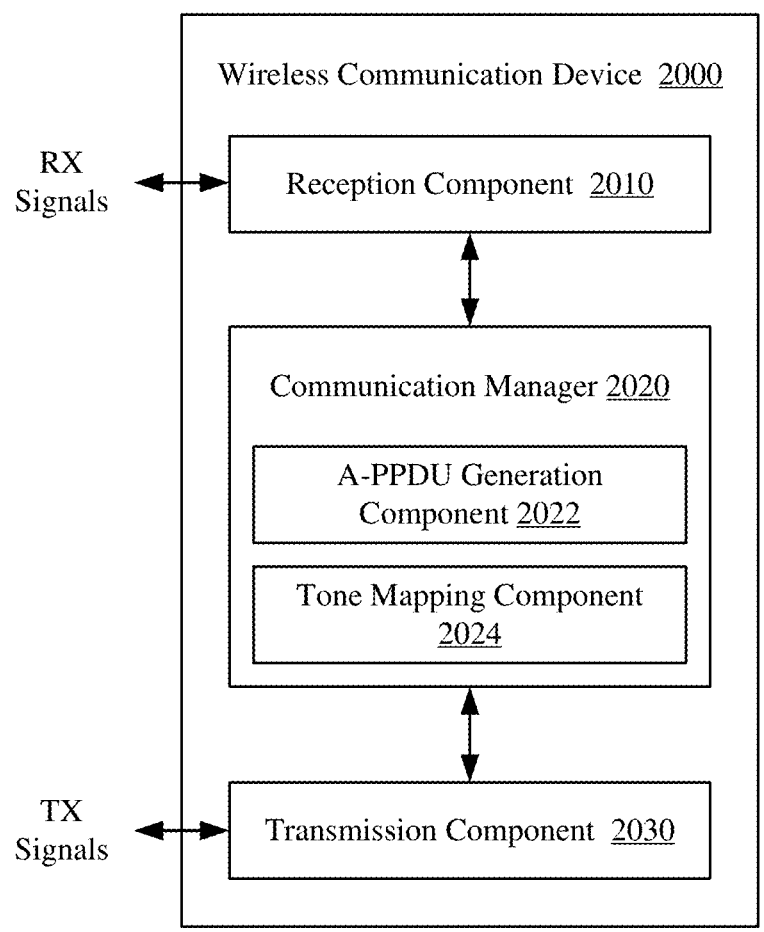
FIG. 20 shows a block diagram of an example wireless communication device according to some implementations.

FIG. 20 shows a block diagram of an example wireless communication device 2000 according to some implementations. In some implementations, the wireless communication device 2000 is configured to perform any of the processes 1800 or 1810 described above with reference to FIGS. 18A and 18B. The wireless communication device 2000 can be an example implementation of the wireless communication device 400 described above with reference to FIG. 4. For example, the wireless communication device 2000 can be a chip, SoC, chipset, package or device that includes at least one processor and at least one modem (for example, a Wi-Fi (IEEE 802.11) modem or a cellular modem).

The wireless communication device 2000 includes a reception component 2010, a communication manager 2020, and a transmission component 2030. The communication manager 2020 further includes an A-PPDU generation component 2022 and a tone mapping component 2024. Portions of one or more of the components 2022 and 2024 may be implemented at least in part in hardware or firmware. In some implementations, at least some of the components 2022 or 2024 are implemented at least in part as software stored in a memory (such as the memory 408). For example, portions of one or more of the components 2022 and 2024 can be implemented as non-transitory instructions (or "code") executable by a processor (such as the processor 406) to perform the functions or operations of the respective component.

The reception component 2010 is configured to receive RX signals, over a wireless channel, from one or more other wireless communication devices. The communication manager 2020 is configured to control or manage communications with the one or more other wireless communication devices. In some implementations, the A-PPDU generation component 2022 may generating a first PPDU that includes first user data intended for a first user, where the first PPDU carries bandwidth information indicating a first bandwidth allocated for the first user data and further carries first duplicate transmission information indicating that the first bandwidth is associated with a duplicate transmission; and the tone mapping component 2024 may map the first user data to a number (N) of tones spanning a first portion of the first bandwidth in accordance with a DCM scheme, and map a duplicate copy of the first user data to N tones spanning a second portion of the first bandwidth in accordance with the DCM scheme. The transmission component 2030 is configured to transmit TX signals, over the wireless channel, to one or more other wireless communication devices. In some implementations, the transmission component 2030 may transmit an A-PPDU, including the first PPDU and a second PPDU, over a wireless channel spanning the first bandwidth and a second bandwidth associated with the second PPDU.

Implementation examples are described in the following numbered clauses:

1. A method for wireless communication by a wireless communication device, including:
   generating a physical layer (PHY) convergence protocol (PLCP) protocol data unit (PPDU) that includes first user data intended for a first user and second user data intended for a second user, the PPDU carrying bandwidth split information indicating a first bandwidth allocated for the first user data and a second bandwidth allocated for the second user data and further carrying duplicate transmission information indicating that the first bandwidth is associated with a duplicate transmission;
   mapping the first user data to a number (N) of tones spanning a first portion of the first bandwidth in accordance with a dual carrier modulation (DCM) scheme;
   mapping a duplicate copy of the first user data to N tones spanning a second portion of the first bandwidth in accordance with the DCM scheme; and
   transmitting the PPDU over a wireless channel spanning the first bandwidth and the second bandwidth.
2. The method of clause 1, where the PPDU is a multi-user (MU) PPDU having a PHY preamble that includes a universal signal field (U-SIG) followed by a non-legacy signal field, the bandwidth split information and the duplicate transmission information being carried in the non-legacy signal field of the PHY preamble.
3. The method of any of clauses 1 or 2, where the bandwidth split information is indicated by a value of a resource unit (RU) allocation subfield of a common field of the non-legacy signal field, the common field carrying information common to each user associated with the PPDU.
4. The method of any of clauses 1-3, where the indication that the first bandwidth is associated with a duplicate transmission is carried in a modulation and coding scheme (MCS) subfield of a user field of the non-legacy signal field that carries information specific to the first user.
5. The method of any of clauses 1-4, where the MCS subfield of the first user field is set to an MCS index equal to 14.
6. The method of any of clauses 1-5, where U-SIG includes an MCS subfield carrying information indicating an MCS associated with the non-legacy signal field, the MCS subfield being set to a value representing rate ½ coding, binary phase-shift keying (BPSK) modulation, and DCM.
7. The method of clause 1, where the PPDU is an MU PPDU having a PHY preamble that includes a U-SIG followed by a non-legacy signal field, the duplicate transmission information being carried in U-SIG and the bandwidth split information being carried in the non-legacy signal field of the PHY preamble.
8. The method of any of clauses 1 or 7, where the duplicate transmission information is indicated by a value of a duplicate transmission indication bit in U-SIG.
9. The method of any of clauses 1 or 7, where the duplicate transmission information is indicated by a value of a PPDU type and compression mode field of U-SIG.
10. The method of any of clauses 1,7, or 8, where the duplicate transmission information is further indicated based on a value of a Validate field of U-SIG.
11. The method of any of clauses 1 or 7-10, where the bandwidth split information is indicated by a value of a bandwidth split field of the non-legacy signal field.
12. The method of any of clauses 1 or 7-11, where U-SIG includes an MCS subfield carrying information indicating an MCS associated with the non-legacy signal field, the MCS subfield being set to a value representing rate ½ coding and BPSK modulation.
13. The method of any of clauses 1-12, further including:
    mapping the second user data to a number (M) of tones spanning a first portion of the second bandwidth in accordance with the DCM scheme; and
    mapping a duplicate copy of the second user data to M tones spanning a second portion of the second bandwidth in accordance with the DCM scheme, the duplicate transmission information further indicating that the second bandwidth is associated with a duplicate transmission.
14. The method of any of clauses 1-13, where the PPDU is an MU PPDU having a PHY preamble that includes a U-SIG followed by a non-legacy signal field, the indication that the second bandwidth is associated with a duplicate transmission being carried in an MCS subfield of a user field of the non-legacy signal field carrying information specific to the second user.
15. A wireless communication device including:
    at least one modem;
    at least one processor communicatively coupled with the at least one modem; and
    at least one memory communicatively coupled with the at least one processor and storing processor-readable code that, when executed by the at least one processor in conjunction with the at least one modem, is configured to perform the method of any one or more of clauses 1-14.
16. A method for wireless communication performed by a wireless communication device, including:

generating a first physical layer (PHY) convergence protocol (PLCP) protocol data unit (PPDU) that includes first user data intended for a first user, the first PPDU carrying bandwidth information indicating a first bandwidth allocated for the first user data and further carrying first duplicate transmission information indicating that the first bandwidth is associated with a duplicate transmission;

mapping the first user data to a number (N) of tones spanning a first portion of the first bandwidth in accordance with a dual carrier modulation (DCM) scheme;

mapping a duplicate copy of the first user data to N tones spanning a second portion of the first bandwidth in accordance with the DCM scheme; and transmitting an aggregated PPDU (A-PPDU), including the first PPDU and a second PPDU, over a wireless channel spanning the first bandwidth and a second bandwidth associated with the second PPDU.

17. The method of clause 16, where the first PPDU is formatted in accordance with a non-legacy multi-user (MU) PPDU format for transmission to a single user.

18. The method of any of clauses 16 or 17, where the indication that the first bandwidth is associated with a duplicate transmission is carried in an MCS subfield of a PHY preamble of the first PPDU.

19. The method of any of clause 16-18, where the second PPDU includes second user data intended for a second user, the method further including:

mapping the second user data to a number (M) of tones spanning a first portion of the second bandwidth in accordance with the DCM scheme; and mapping a duplicate copy of the second user data to M tones spanning a second portion of the second bandwidth in accordance with the DCM scheme, the second PPDU carrying second duplicate transmission information indicating that the second bandwidth is associated with a duplicate transmission.

20. The method of any of clause 16-19, where the second PPDU is formatted in accordance with a non-legacy MU PPDU format for transmission to a single user.

21. The method of any of clause 16-20, where the indication that the second bandwidth is associated with a duplicate transmission is carried in an MCS subfield of a PHY preamble of the second PPDU.

22. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 16-21.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:

generating a physical layer (PHY) convergence protocol (PLCP) protocol data unit (PPDU) that includes first user data intended for a first user and second user data intended for a second user, the PPDU carrying bandwidth split information indicating a first bandwidth allocated for the first user data and a second bandwidth allocated for the second user data and further carrying duplicate transmission information indicating that the first bandwidth is associated with a duplicate transmission;

mapping the first user data to a number (N) of tones spanning a first portion of the first bandwidth in accordance with a dual carrier modulation (DCM) scheme;

mapping a duplicate copy of the first user data to N tones spanning a second portion of the first bandwidth in accordance with the DCM scheme; and transmitting the PPDU over a wireless channel spanning the first bandwidth and the second bandwidth.

2. The method of claim 1, wherein the PPDU is a multi-user (MU) PPDU having a PHY preamble that includes a universal signal field (U-SIG) followed by a non-legacy signal field, the bandwidth split information and the duplicate transmission information being carried in the non-legacy signal field of the PHY preamble.

3. The method of claim 2, wherein the bandwidth split information is indicated by a value of a resource unit (RU) allocation subfield of a common field of the non-legacy signal field, the common field carrying information common to each user associated with the PPDU.

4. The method of claim 2, wherein the indication that the first bandwidth is associated with a duplicate transmission is carried in a modulation and coding scheme (MCS) subfield of a user field of the non-legacy signal field that carries information specific to the first user.

5. The method of claim 4, wherein the MCS subfield of the first user field is set to an MCS index equal to 14.

6. The method of claim 2, wherein U-SIG includes an MCS subfield carrying information indicating an MCS associated with the non-legacy signal field, the MCS subfield being set to a value representing rate 1/2 coding, binary phase-shift keying (BPSK) modulation, and DCM.

7. The method of claim 1, wherein the PPDU is a multi-user (MU) PPDU having a PHY preamble that includes a universal signal field (U-SIG) followed by a non-legacy signal field, the duplicate transmission information being carried in U-SIG and the bandwidth split information being carried in the non-legacy signal field of the PHY preamble.

8. The method of claim 7, wherein the duplicate transmission information is indicated by a value of a duplicate transmission indication bit in U-SIG.

9. The method of claim 7, wherein the duplicate transmission information is indicated based on a value of a PPDU type and compression mode field of U-SIG.

10. The method of claim 9, wherein the duplicate transmission information is further indicated based on a value of a Validate field of U-SIG.

11. The method of claim 7, wherein the bandwidth split information is indicated by a value of a bandwidth split field of the non-legacy signal field.

12. The method of claim 7, wherein U-SIG includes an MCS subfield carrying information indicating an MCS associated with the non-legacy signal field, the MCS subfield being set to a value representing rate 1/2 coding and BPSK modulation.

13. The method of claim 1, further comprising:
mapping the second user data to a number (M) of tones spanning a first portion of the second bandwidth in accordance with the DCM scheme; and
mapping a duplicate copy of the second user data to M tones spanning a second portion of the second bandwidth in accordance with the DCM scheme, the duplicate transmission information further indicating that the second bandwidth is associated with a duplicate transmission.

14. The method of claim 13, wherein the PPDU is a multi-user (MU) PPDU having a PHY preamble that includes a U-SIG followed by a non-legacy signal field, the indication that the second bandwidth is associated with a duplicate transmission being carried in an MCS subfield of a user field of the non-legacy signal field carrying information specific to the second user.

15. A wireless communication device comprising:
a processor; and
memory coupled with the processor and storing instructions executable by the processor to cause the wireless communication device to:
generate a physical layer (PHY) convergence protocol (PLCP) protocol data unit (PPDU) that includes first user data intended for a first user and second user data intended for a second user, the PPDU carrying bandwidth split information indicating a first bandwidth allocated for the first user data and a second bandwidth allocated for the second user data and further carrying duplicate transmission information indicating that the first bandwidth is associated with a duplicate transmission;
map the first user data to a number (N) of tones spanning a first portion of the first bandwidth in accordance with a dual carrier modulation (DCM) scheme;
map a duplicate copy of the first user data to N tones spanning a second portion of the first bandwidth in accordance with the DCM scheme; and
transmit the PPDU over a wireless channel spanning the first bandwidth and the second bandwidth.

16. The wireless communication device of claim 15, wherein the PPDU is a multi-user (MU) PPDU format having a PHY preamble that includes a universal signal field (USIG) followed by a non-legacy signal field, the bandwidth split information and the duplicate transmission information being carried in the non-legacy signal field of the PHY preamble.

17. The wireless communication device of claim 16, wherein the bandwidth split information is indicated by a value of a resource unit (RU) allocation subfield of a common field of the non-legacy signal field, the common field carrying information common to each user associated with the PPDU.

18. The wireless communication device of claim 16, wherein the indication that the first bandwidth is associated with a duplicate transmission is carried in a modulation and coding scheme (MCS) subfield of a user field of the non-legacy signal field carrying information specific to the first user.

19. The wireless communication device of claim 15, wherein the PPDU includes a PHY preamble that includes a universal signal field (U-SIG) followed by a non-legacy signal field, the duplicate transmission information being carried in U-SIG and the bandwidth split information being carried in the non-legacy signal field of the PHY preamble.

20. The wireless communication device of claim 19, wherein the duplicate transmission information is indicated by a value of a duplicate transmission indication bit in U-SIG or a value of a PPDU type and compression mode field of U-SIG.

21. The wireless communication device of claim 19, wherein the bandwidth split information is indicated by a value of a bandwidth split field of the non-legacy signal field.

22. The wireless communication device of claim 15, wherein the instructions executable by the processor further cause the wireless communication device to:
map the second user data to a number (M) of tones spanning a first portion of the second bandwidth in accordance with the DCM scheme; and map a duplicate copy of the second user data to M tones spanning a second portion of the second bandwidth in accordance with the DCM scheme, the duplicate transmission information further indicating that the second bandwidth is associated with a duplicate transmission.

23. A method for wireless communication performed by a wireless communication device, comprising:
generating a first physical layer (PHY) convergence protocol (PLCP) protocol data unit (PPDU) that includes first user data intended for a first user, the first PPDU carrying bandwidth information indicating a first bandwidth allocated for the first user data and further carrying first duplicate transmission information indicating that the first bandwidth is associated with a duplicate transmission;
mapping the first user data to a number (N) of tones spanning a first portion of the first bandwidth in accordance with a dual carrier modulation (DCM) scheme;
mapping a duplicate copy of the first user data to N tones spanning a second portion of the first bandwidth in accordance with the DCM scheme; and
transmitting an aggregated PPDU (A-PPDU), including the first PPDU and a second PPDU, over a wireless channel spanning the first bandwidth and a second bandwidth associated with the second PPDU.

24. The method of claim 23, wherein the first PPDU is formatted in accordance with a non-legacy multi-user (MU) PPDU format for transmission to a single user.

25. The method of claim 24, wherein the indication that the first bandwidth is associated with a duplicate transmission is carried in an MCS subfield of a PHY preamble of the first PPDU.

26. The method of claim 23, wherein the second PPDU includes second user data intended for a second user, the method further comprising:
mapping the second user data to a number (M) of tones spanning a first portion of the second bandwidth in accordance with the DCM scheme; and
mapping a duplicate copy of the second user data to M tones spanning a second portion of the second bandwidth in accordance with the DCM scheme, the second PPDU carrying second duplicate transmission information indicating that the second bandwidth is associated with a duplicate transmission.

27. The method of claim 26, wherein the second PPDU is formatted in accordance with a non-legacy multi-user (MU) PPDU format for transmission to a single user.

28. The method of claim 27, wherein the indication that the second bandwidth is associated with a duplicate transmission is carried in an MCS subfield of a PHY preamble of the second PPDU.

29. A wireless communication device comprising:
a processor; and
memory coupled with the processor and storing instructions executable by the processor to cause the wireless communication device to:
generate a first physical layer (PHY) convergence protocol (PLCP) protocol data unit (PPDU) that includes first user data intended for a first user, the first PPDU carrying bandwidth information indicating a first bandwidth allocated for the first user data and further carrying first duplicate transmission information indicating that the first bandwidth is associated with a duplicate transmission;
map the first user data to a number (N) of tones spanning a first portion of the first bandwidth in accordance with a dual carrier modulation (DCM) scheme;
map a duplicate copy of the first user data to N tones spanning a second portion of the first bandwidth in accordance with the DCM scheme; and
transmit an aggregated PPDU (A-PPDU), including the first PPDU and a second PPDU, over a wireless channel spanning the first bandwidth and a second bandwidth associated with the second PPDU.

30. The wireless communication device of claim 29, wherein the second PPDU includes second user data intended for a second user, and wherein the instructions executable by the processor further cause the wireless communication device to:
map the second user data to a number (M) of tones spanning a first portion of the second bandwidth in accordance with the DCM scheme; and
map a duplicate copy of the second user data to M tones spanning a second portion of the second bandwidth in accordance with the DCM scheme, the second PPDU carrying second duplicate transmission information indicating that the second bandwidth is associated with a duplicate transmission.

* * * * *